United States Patent
Lau et al.

(10) Patent No.: US 10,739,031 B2
(45) Date of Patent: Aug. 11, 2020

(54) SYSTEM AND METHOD USING MOBILE DEVICE FOR AUTOMATIC CONTROL ON HEATING, VENTILATION AND AIR CONDITIONING

(71) Applicant: Skylett Environmental Engineering Co. Limited, Hong Kong (HK)

(72) Inventors: Tak On Andrew Lau, Hong Kong (HK); Gin Nam Sze To, Hong Kong (HK)

(73) Assignee: Skylett Environmental Engineering Co. Limited, Hong Kong (HK)

( * ) Notice: Subject to any disclaimer, the term of this patent is extended or adjusted under 35 U.S.C. 154(b) by 0 days.

(21) Appl. No.: 16/124,185

(22) Filed: Sep. 6, 2018

(65) Prior Publication Data

US 2020/0080741 A1    Mar. 12, 2020

(51) Int. Cl.
| | |
|---|---|
| *F24F 11/64* | (2018.01) |
| *F24F 11/46* | (2018.01) |
| *F24F 11/58* | (2018.01) |
| *F24F 11/65* | (2018.01) |
| *G05B 15/02* | (2006.01) |
| *F24F 120/12* | (2018.01) |

(52) U.S. Cl.
CPC ............ *F24F 11/46* (2018.01); *F24F 11/58* (2018.01); *F24F 11/64* (2018.01); *F24F 11/65* (2018.01); *G05B 15/02* (2013.01); *F24F 2120/12* (2018.01)

(58) Field of Classification Search
None
See application file for complete search history.

(56) References Cited

U.S. PATENT DOCUMENTS

| | | | |
|---|---|---|---|
| 8,036,778 B2 | 10/2011 | Masuda et al. | |
| 2010/0057259 A1* | 3/2010 | Dawson | G05B 15/02 700/278 |
| 2010/0204807 A1* | 8/2010 | Isaacson | G05B 19/0426 700/28 |

(Continued)

FOREIGN PATENT DOCUMENTS

| | | |
|---|---|---|
| CN | 101514827 A | 8/2009 |
| CN | 104896668 A | 9/2015 |

(Continued)

OTHER PUBLICATIONS

International Search Report of PCT Patent Application No. PCT/CN2019/103881 dated Nov. 21, 2019.

*Primary Examiner* — Thomas C Lee
*Assistant Examiner* — Gary Collins

(57) ABSTRACT

A system for an automatic temperature control of a space is described. The system includes a temperature maintaining unit, a controller connected to the temperature maintaining unit, and a user device that is communicably connected to the controller. There may also be a temperature sensing unit. The controller is configured to detect a presence of a user device within its vicinity. When the user device is detected, the controller reads the personal thermal comfort parameters from the user device, that may be stored within the user device. The controller further detects the temperature of the space through the temperature sensing unit and controls various functional parameters of the temperature maintaining unit based on the personal thermal comfort parameters of the user.

9 Claims, 22 Drawing Sheets

(56) References Cited

U.S. PATENT DOCUMENTS

| | | | | |
|---|---|---|---|---|
| 2012/0031984 A1* | 2/2012 | Feldmeier | ................ | F24F 11/30 |
| | | | | 236/49.3 |
| 2012/0158203 A1* | 6/2012 | Feldstein | .............. | G06F 1/3231 |
| | | | | 700/295 |
| 2012/0316687 A1* | 12/2012 | Chen | ....................... | H02J 3/008 |
| | | | | 700/276 |
| 2013/0325196 A1 | 12/2013 | Basson et al. | | |
| 2014/0222210 A1* | 8/2014 | Agarwal | ............... | G05B 15/02 |
| | | | | 700/275 |
| 2014/0309789 A1* | 10/2014 | Ricci | ....................... | B60Q 1/00 |
| | | | | 700/276 |
| 2015/0338117 A1* | 11/2015 | Henneberger | ......... | G05B 15/02 |
| | | | | 700/276 |
| 2016/0047565 A1* | 2/2016 | Robinson | ............ | H04L 12/2803 |
| | | | | 700/278 |
| 2016/0231718 A1* | 8/2016 | Logan | ..................... | G05B 15/02 |
| 2016/0320083 A1* | 11/2016 | Windgassen | ....... | G05D 23/1905 |
| 2019/0285303 A1* | 9/2019 | Pathak | ..................... | F24F 11/61 |

FOREIGN PATENT DOCUMENTS

| | | |
|---|---|---|
| CN | 105091234 A | 11/2015 |
| CN | 106225185 A | 12/2016 |
| JP | 201268020 A | 4/2012 |

* cited by examiner

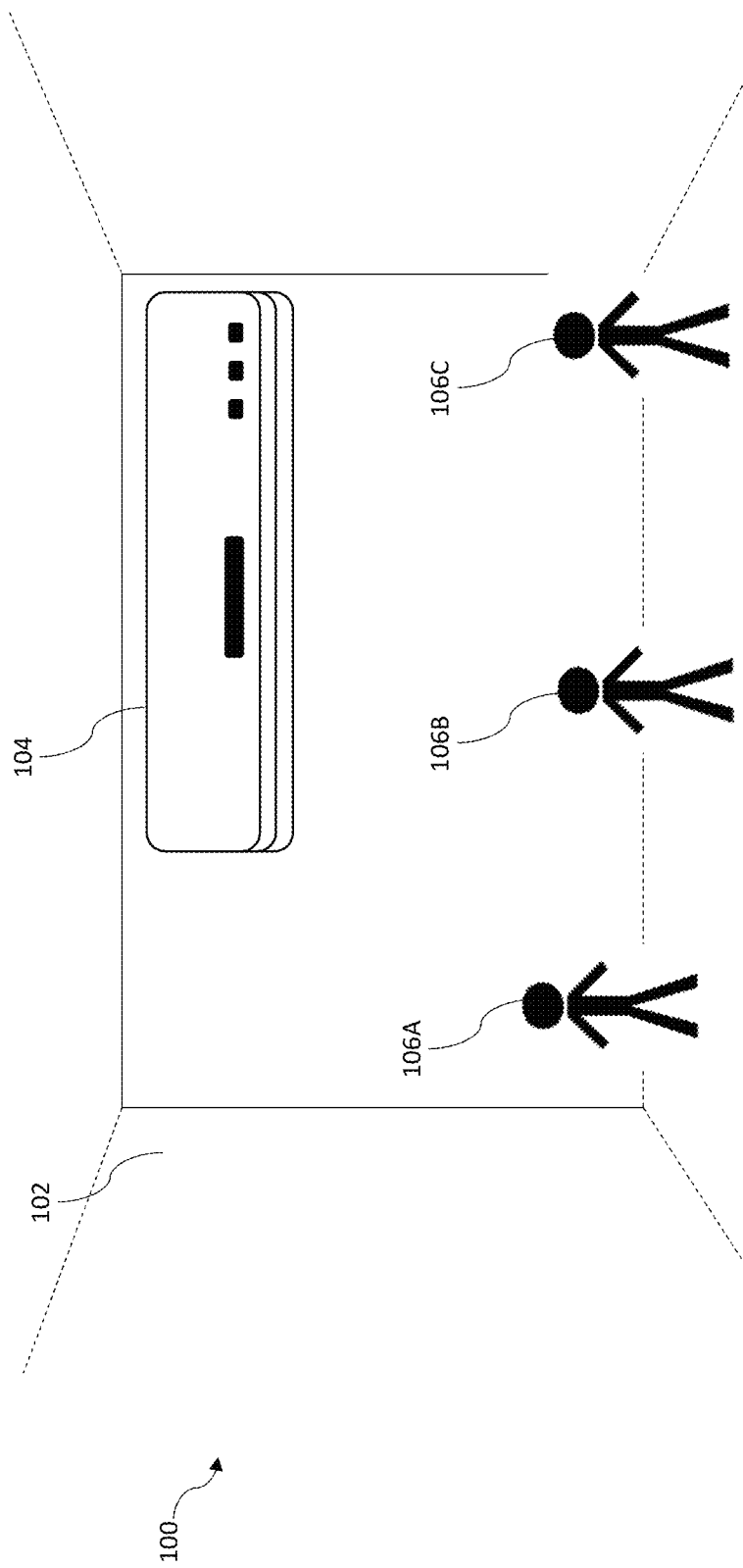

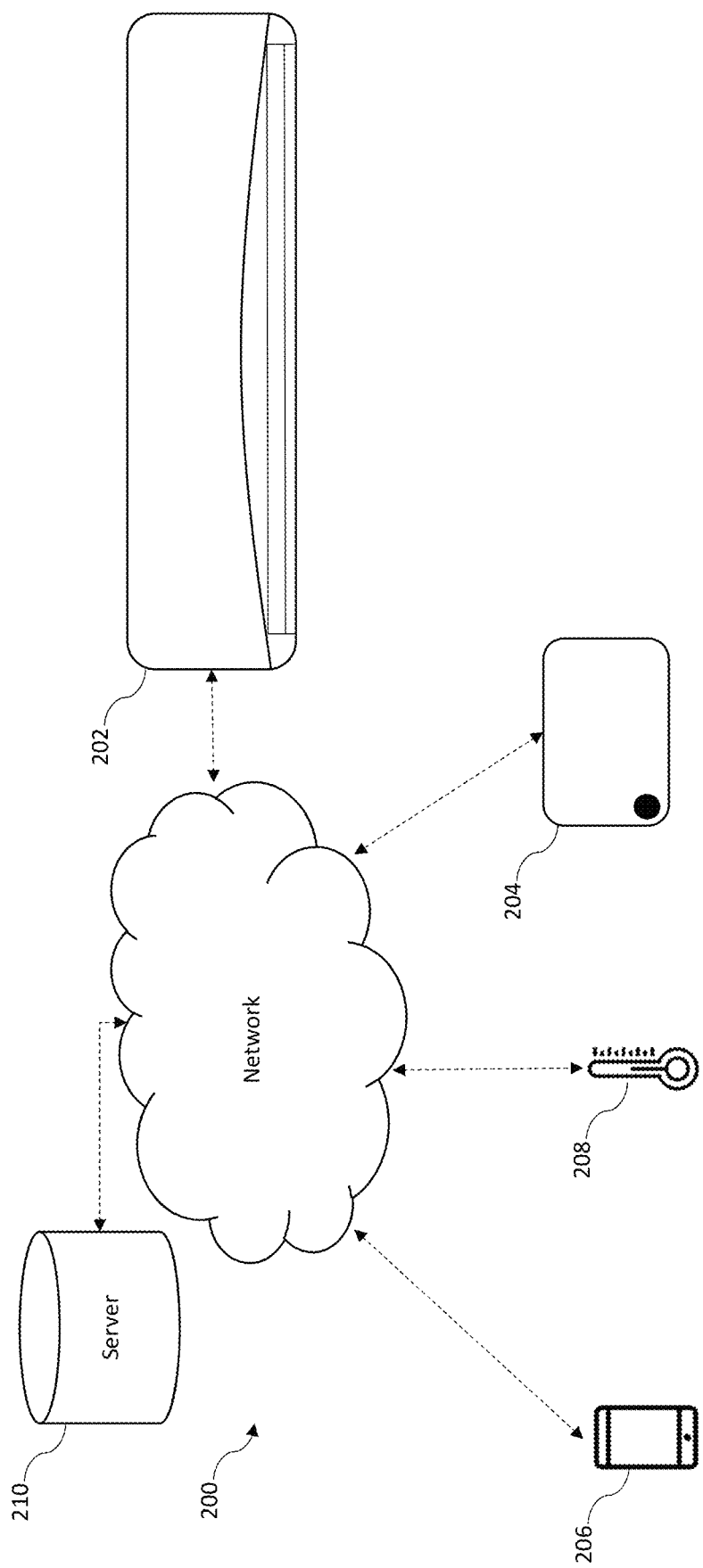

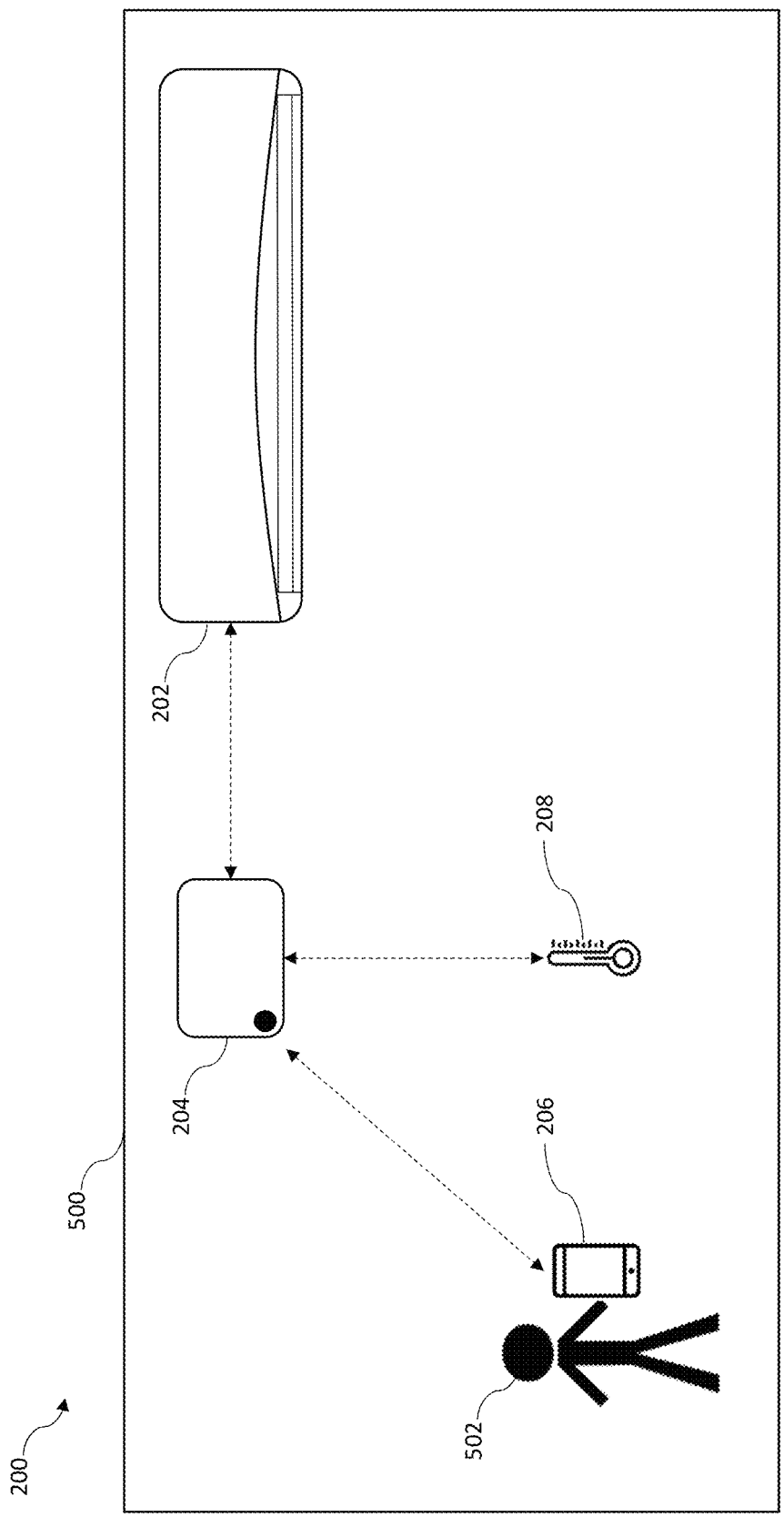

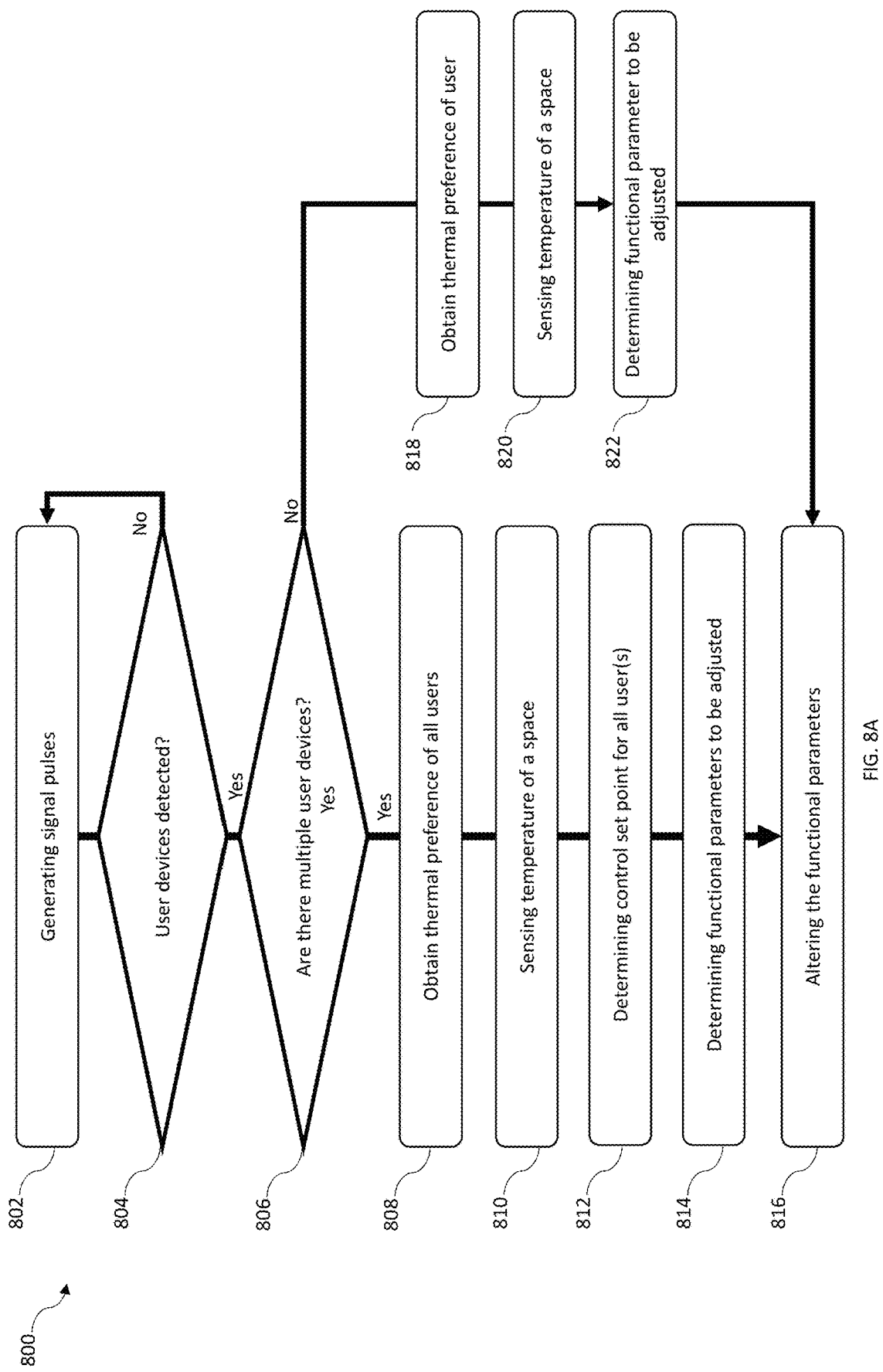

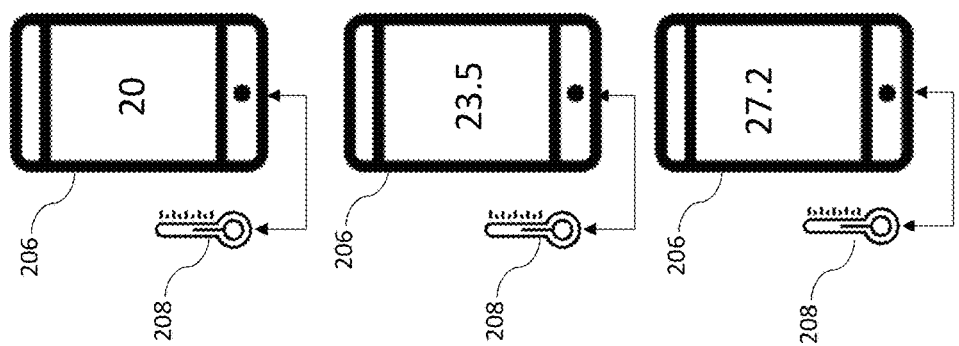
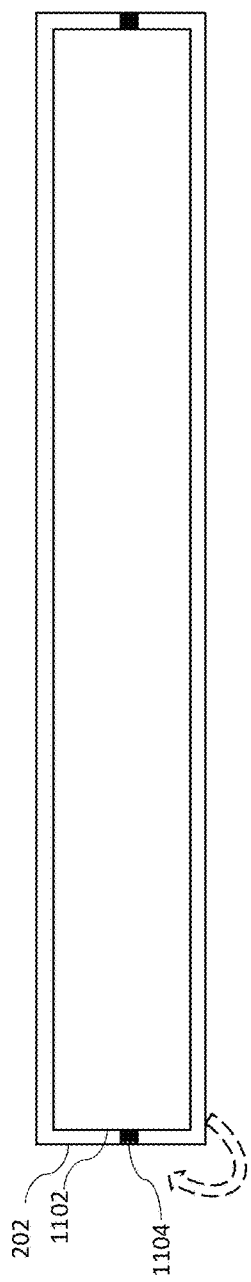
FIG. 11A
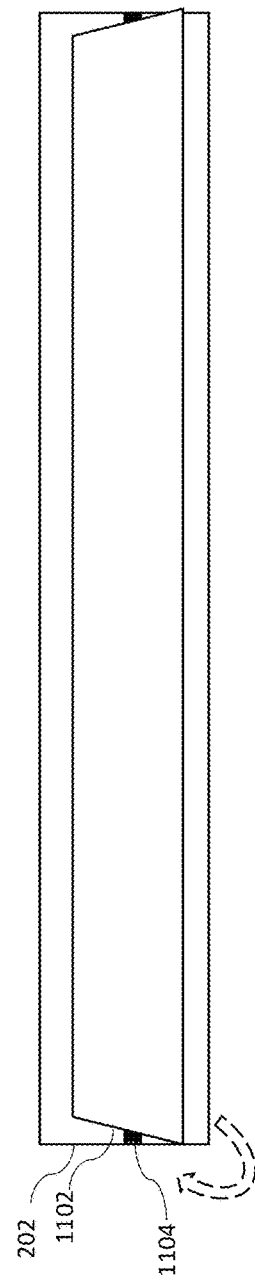
FIG. 11B
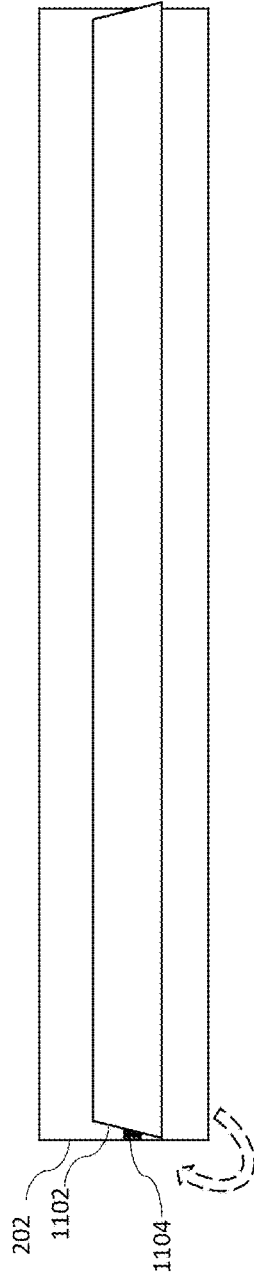
FIG. 11C

SYSTEM AND METHOD USING MOBILE DEVICE FOR AUTOMATIC CONTROL ON HEATING, VENTILATION AND AIR CONDITIONING

TECHNICAL FIELD OF THE INVENTION

The present application described herein, in general, relates to a field of automatic temperature control, and more particularly to a heating, ventilation and air conditioning (HVAC) system control and a method thereof enabling the control by detecting personal thermal comfort of a user present within a vicinity of the HVAC system.

BACKGROUND

Heating, ventilation, and air conditioning (HVAC) system is an integral part of modern day buildings. HVAC system helps to maintain thermal comfort and ventilation needs of the occupants in the buildings. HVAC system requires a considerable amount of energy. In general, HVAC system accounts for nearly 40% or more of the total energy cost in building. There are solutions that do provide the much-needed energy efficiency for the HVAC system. One of such solutions is an automatic control on the HVAC system. The automatic control provides a flexible adjustment to thermal comfort and reduces HVAC system energy cost by reducing excessive cooling, heating, and equipment power.

Another typical solution prevalent in use these days often controls the temperature or flow rate of the conditioned air in an occupied room according to parameters of the room, such as temperature, humidity, carbon dioxide level, etc. This method can automatically adjust the thermal comfort to a suitable level and reduce the HVAC system energy cost to some extent.

Further, temperature sensors may not be accurate. There may be certain amount of error that may exist in temperature sensors. A certain temperature may be comfortable for an individual, however, it may not be comfortable for other individual.

However, it cannot take care of the personal thermal comfort preference of the room occupant. This is because different individuals may have different needs for heating and cooling.

Therefore, there is required a more efficient HVAC control system and method in order to provide better energy efficiency. An efficient solution is also required as temperature sensors require regular calibration to maintain acceptable accuracy and allow HVAC system to be controlled in a reasonable manner.

SUMMARY

This summary is provided to introduce concepts related to systems and methods for serving one or more items and the concepts are further described below in the detailed description. This summary is not intended to identify essential features of the claimed subject matter nor is it intended for use in determining or limiting the scope of the claimed subject matter.

The present subject matter describes a system for automatic temperature control of a space. The system includes a temperature maintaining unit that may be configured to provide thermal comfort in the space. The system further includes a controller connected to the temperature maintaining unit that is configured to alter various functional parameters of the temperature maintaining unit. The system further includes a user device that is communicably connected to the controller and also configured to record a personal thermal comfort preference of a user. The controller, that is communicably connected to the temperature maintaining unit of the system provides a function of providing a real time maintaining of the temperature maintaining unit based on the personal thermal comfort preference of the user by altering the plurality of functional parameters of the temperature maintaining unit. The plurality of temperature maintaining parameters may be temperature control, an actuator of a damper, regulation of airflow, adjustment of power of a fan of the temperature maintaining unit, and adjustment of an opening of a cooling/heating valve.

The present subject matter further describes a method of automatic temperature control of a space. The method includes sensing, by at least one temperature sensing unit, the real time temperature status of the space that is being serviced by at least one temperature maintaining unit. The method further includes detecting, by a controller, the presence of at least one user device wherein the user device is configured to record and store personal thermal comfort of a user. The method further includes altering, by the controller, at least one of a plurality of functional parameters of the temperature maintaining unit in real time that is based on the personal thermal comfort preference of the user and the real time temperature status of the space.

The present subject matter further describes a transitory computer readable storage medium controlling temperature within a space, when executed by a computing device, cause the computing device to sense, by at least one temperature sensing unit, the real time temperature status of the space that is being serviced by at least one temperature maintaining unit. The method further includes detecting, by a controller, the presence of at least one user device wherein the user device is configured to record and store personal thermal comfort of a user. The method further includes altering, by the controller, at least one of a plurality of functional parameters of the temperature maintaining unit in real time that is based on the personal thermal comfort preference of the user and the real time temperature status of the space. Also, an objective of the invention is to provide unnecessary calibration of temperature sensors by utilizing fuzzy logic to understand the personalized temperature performance, the controller may auto adjust for requirements based on certain predictable features such as cool, warm, cold, hot etc.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer to like features and components.

FIG. 1 depicts a line diagram of a general environment for the functioning of the invention in general, in accordance with an embodiment of the invention;

FIG. 3A-3B depict line diagrams of a system for automatic control of temperature, in accordance with another embodiment of the invention;

FIG. 5 depicts a line diagram of a system for detecting a user device for automatic control of temperature, in accordance with another embodiment of the invention;

FIG. 8A depicts a flowchart of a method for detecting multiple user devices for automatic control of temperature, in accordance with another embodiment of the invention;

FIG. 11A-11C depicts line diagrams depicting the controlling of functional parameters of a temperature maintaining unit for temperature control, in accordance with an embodiment of the invention;

DETAILED DESCRIPTION

Various embodiments of the present application will be described below in conjunction with the accompanying drawings.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items or meant to be limited to only the listed item or items. It must also be noted that as used herein, the singular forms "a," "an," and "the" include plural references unless the context clearly dictates otherwise. Although any apparatuses, devices, and methods similar or equivalent to those described herein can be used in the practice or testing of embodiments of the present disclosure, the exemplary, apparatuses, devices and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated but is to be accorded the widest scope consistent with the principles and features described herein.

The present application relates to an automatic control system (hereinafter also referred to as "system") for controlling HVAC equipment. The automatic control system of the present application can reduce the excessive energy consumption of HVAC equipment and cater for thermal comfort and ventilation needs of the room occupant. The system can adjust the temperature setting and/or air flow rate of an air conditioner, heater and/or actuator of a damper and/or the power of a fan. The controller provides real time control on heating, ventilation and air conditioning through one or more temperature sensors and mobile device in an air-conditioned space.

Referring to FIG. 1, a line diagram of a general environment 100, wherein the current invention may function, in accordance with an embodiment of the invention. The general environment may include a space 102 that may be a room of a house, an office building, a shopping area, a play area, or any other such place. The space 102 may be provided with a temperature maintaining unit 104 that may be a heating, ventilation, air conditioning (HVAC) equipment. An HVAC equipment maintains temperature comfortable for occupants of the space 102. HVAC equipment may include air conditioner, heater, ventilator, exhaust etc. The room 102 may be occupied by multiple occupants like 106A-106C.

Figure 2A:
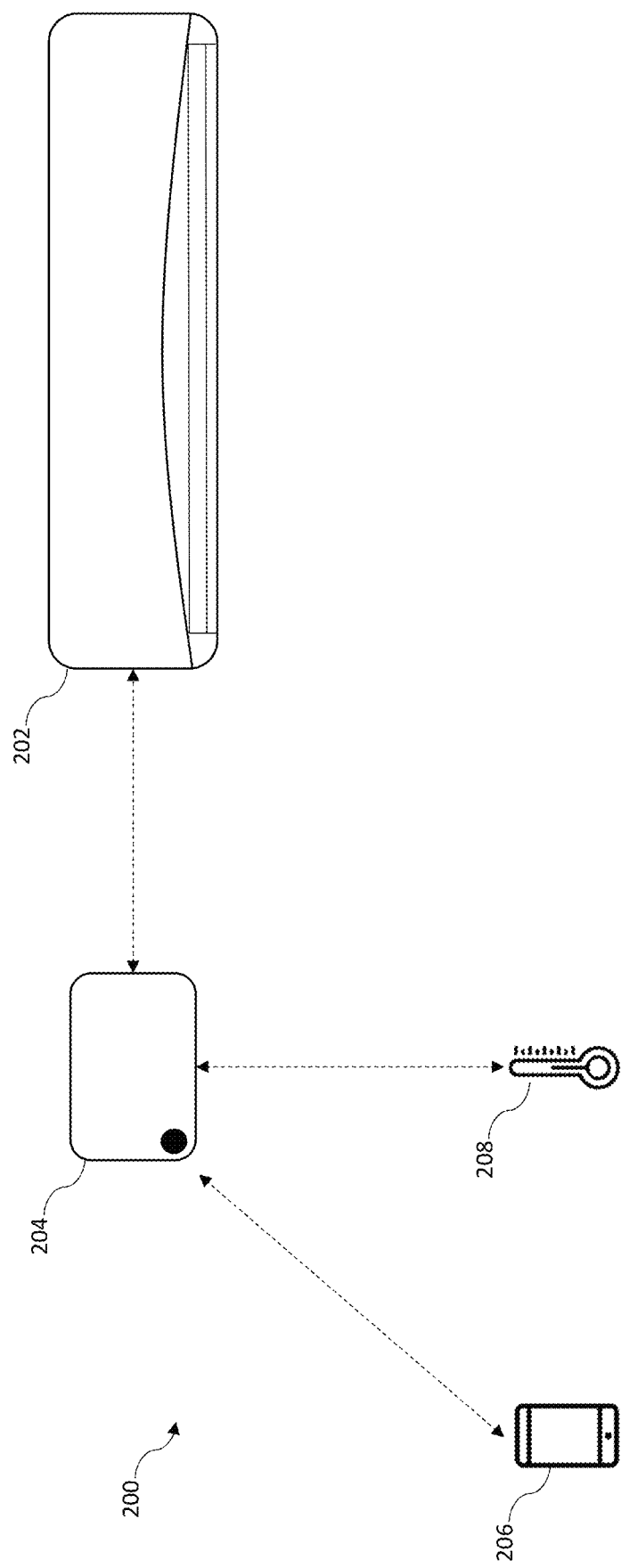
FIG. 2A depicts a line diagram of a system for automatic control of temperature, in accordance with an embodiment of the invention.

Referring now to FIG. 2A, a line diagram illustrating a system 200 for automatic control of temperature, in accordance with an embodiment of the invention. As illustrated, the system includes a temperature maintaining unit 202, a controller 204, a user device 206, and a temperature sensing unit 208.

In operation, the temperature maintaining unit 202 may be connected to the controller 204. Further, the controller 204 may also be communicably connected to the temperature sensing unit 208. The controller 204 is also communicably connected to the user device 206.

As described above, in conjunction with FIG. 1, the temperature unit 202 may be an HVAC equipment. The HVAC equipment is responsible for maintaining proper temperature and ventilation conditions for occupants within a space.

The controller 204, may be a control unit including various actuators for controlling of multiple parameters of the temperature maintaining unit 202. According to an embodiment of the invention, the multiple functional parameters may be temperature control, an actuator of a damper, regulation of airflow, adjustment of power of a fan of the temperature maintaining unit, and adjustment of an opening of a cooling/heating valve of the temperature maintaining unit 202. The controller 204 may use one or a combination of a proportional gain feedback control, a PI feedback control, a PID (proportional-integral-derivative) feedback control, an adaptive control, a predictive control, a feedforward control, a sliding mode control, a PID fuzzy logic control, a neural-network fuzzy logic control, and a genetic algorithm fuzzy logic control to alter the temperature maintaining unit 202. The controller 204 may also utilize a manual input that will be described later in detail. The fuzzy logic also helps to determine personalized temperature performance. The controller 204, may also adjust for required temperature needs without any actual calibration of temperature sensors. The fuzzy logic auto adjusts the temperature required based on some predictable features such as cold, cool, warm, hot, etc.

In an embodiment of the invention, the controller 204 may be integrated within the temperature maintaining unit 202. However, in another embodiment, the controller 204 may be an add-on a unit. In add-on unit embodiment, there may be two parts of the controller 204. One master unit and a slave unit. The master unit may control the slave unit wherein the slave unit includes actuators, motors etc. to control various functional parameters of the temperature maintaining unit 202.

In add-on unit embodiment the master unit and slave unit may also be placed in local and remote placement. In local placement, the master unit and slave unit may be placed in a line of sight of each other or in close proximity of each other. However, in remote placement, the master unit may be placed remote to the slave unit and may communicate with each other via a network as discussed in detail later in the description.

The temperature sensing unit 208 may be an analog or digital thermometer, a thermocouple, a semiconductor-based temperature sensor, or a thermistor. The temperature sensing unit 208 determines the temperature of the space in real time.

The user device 206 may be a mobile phone, a smartwatch, a tablet computer, and a laptop computer. The user device 206 may be provided with a software application that may connect the user device 206 to the controller 204. The software application may be pre-installed or may be downloaded from corresponding application stores of different operating systems. The application may be compiled in any language like Java, C++, python etc. based on the compatibility of the operating software of the user device 206.

The temperature maintaining unit 202, the controller 204, the user device 206 and the temperature sensing unit 208 can wirelessly communicate with each other, through at least one Network. In one implementation, the network may be a wireless network, a wired network or a combination thereof. The network can be implemented as one of the different types of networks, such as intranet, local area network (LAN), wide area network (WAN), the Internet, a telephone network (e.g., analog, digital, POTS, PSTN, ISDN, xDSL), a mobile telephone network (e.g., CDMA, GSM, NDAC, TDMA, E-TDMA, NAMPS, WCDMA, CDMA-2000, UMTS, 3G, 4G, 5G), a radio network, a television network, a cable network, an optical network (e.g., PON), a satellite network (e.g., VSAT), a packet-switched network, a circuit-switched network, a public network, a private network, a Bluetooth network, a ZigBee network, and/or other wired or wireless communications network configured to carry data. Computing devices and networks also may support wireless wide area network (WWAN) communications services including Internet access such as EV-DO, EV-DV, CDMA/1xRTT, GSM/GPRS, EDGE, HSDPA, HSUPA, Internet of things (IoT) and others. The network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network may include a variety of network devices, including routers, bridges, servers, computing devices, storage devices, and the like.

Figure 2B:
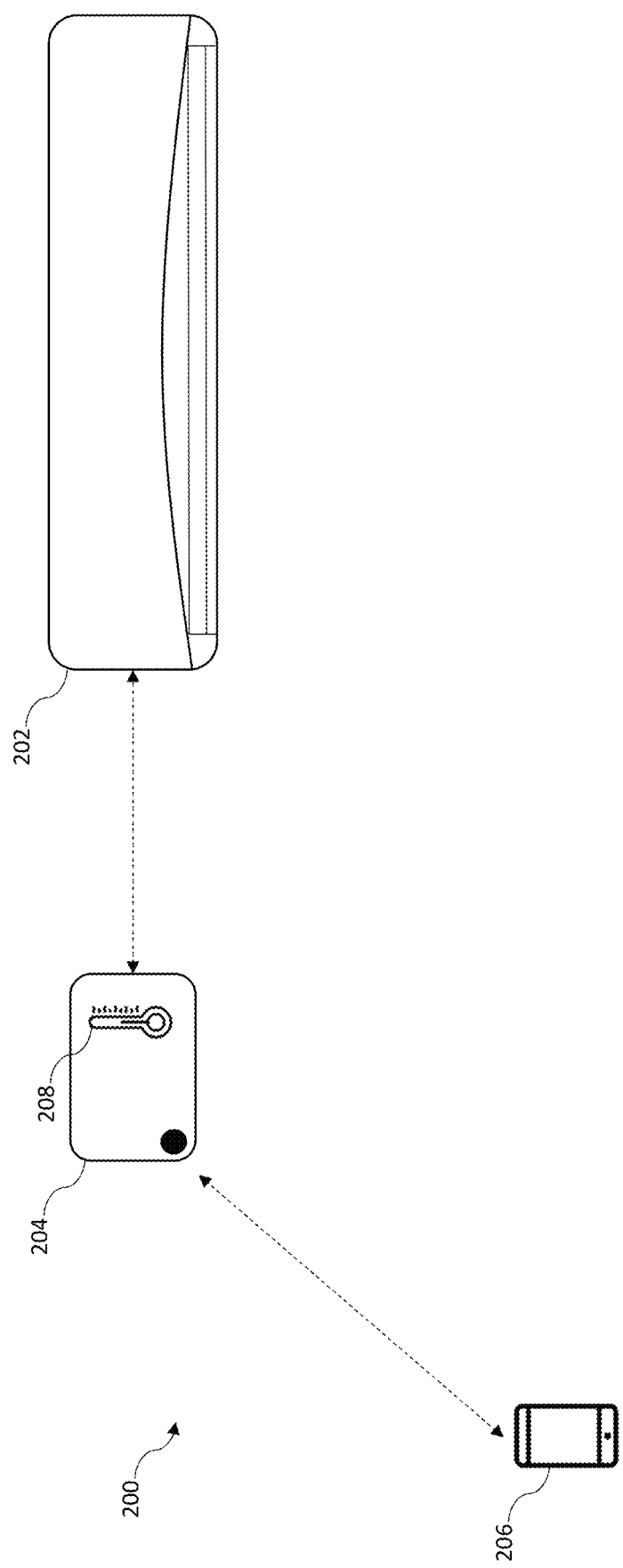
FIG. 2B depicts a line diagram of a system for automatic control of temperature, in accordance with another embodiment of the invention.

In another implementation of the invention, as depicted in FIG. 2B, the temperature sensing unit 208 may be integrated within the controller 204. The temperature sensing unit 208 may be either inbuilt within the controller 204 or may be physically connected to the controller 204.

Figure 2C:
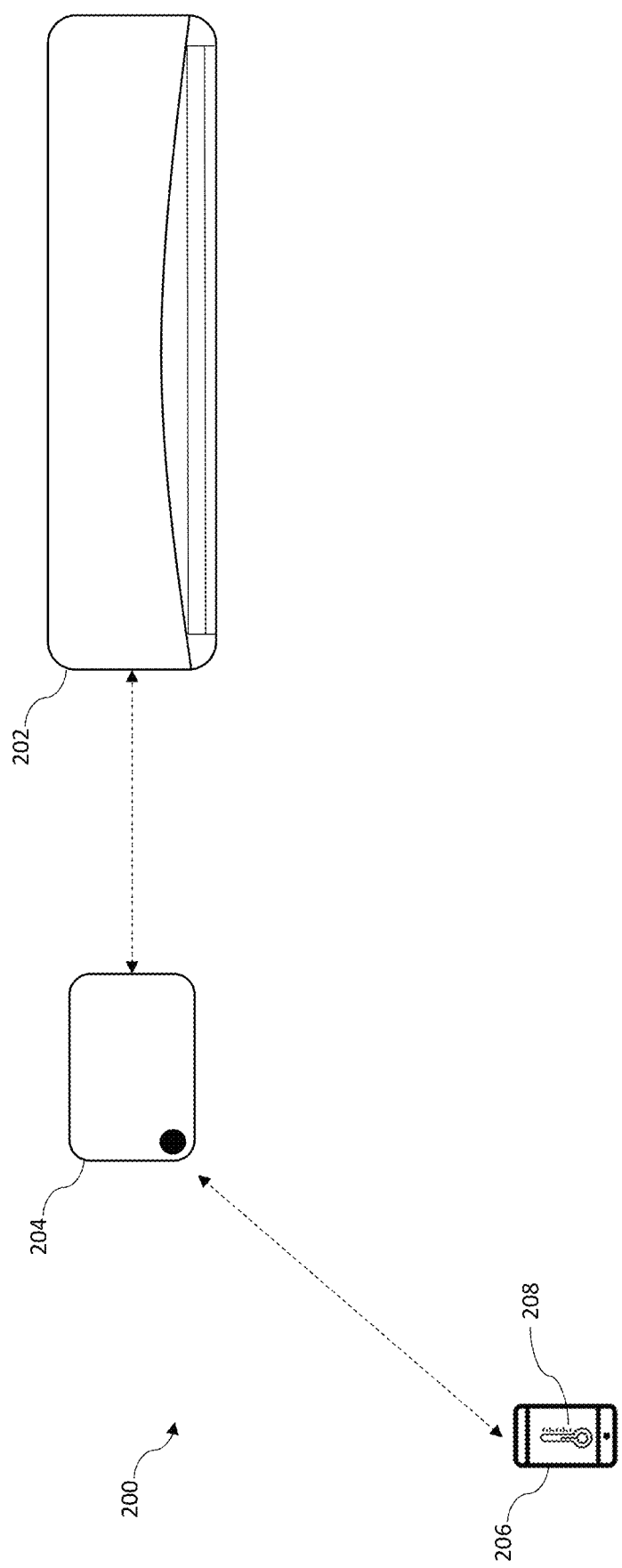
FIG. 2C depicts a line diagram of a system for automatic control of temperature, in accordance with another embodiment of the invention.

In another implementation of the invention, as depicted in FIG. 2C, the temperature sensing unit 208 may be integrated within the user device 206. The temperature sensing unit 208 may either be built in the user device 206 or may be physically connected to the user device 206. The physical connection may be, by way of an example, through a USB port, or through a 3.5 mm jack port of a mobile device.

In another implementation of the invention, the controller 204 may be connected to the temperature maintaining unit 202 through a wireless network as described above. In such an implementation, the controller 204 controls various parameters of the temperature maintaining unit 202 from a remote location as well. Further, there might be a slave device (not shown in the figure), as a part of the controller 204, that may be installed with the temperature maintaining unit 202 with which the controller 204 communicates to control various parameters. The slave device may include various actuators, motors etc. for controlling functional parameters of the temperature maintaining unit 202.

Figure 3A:
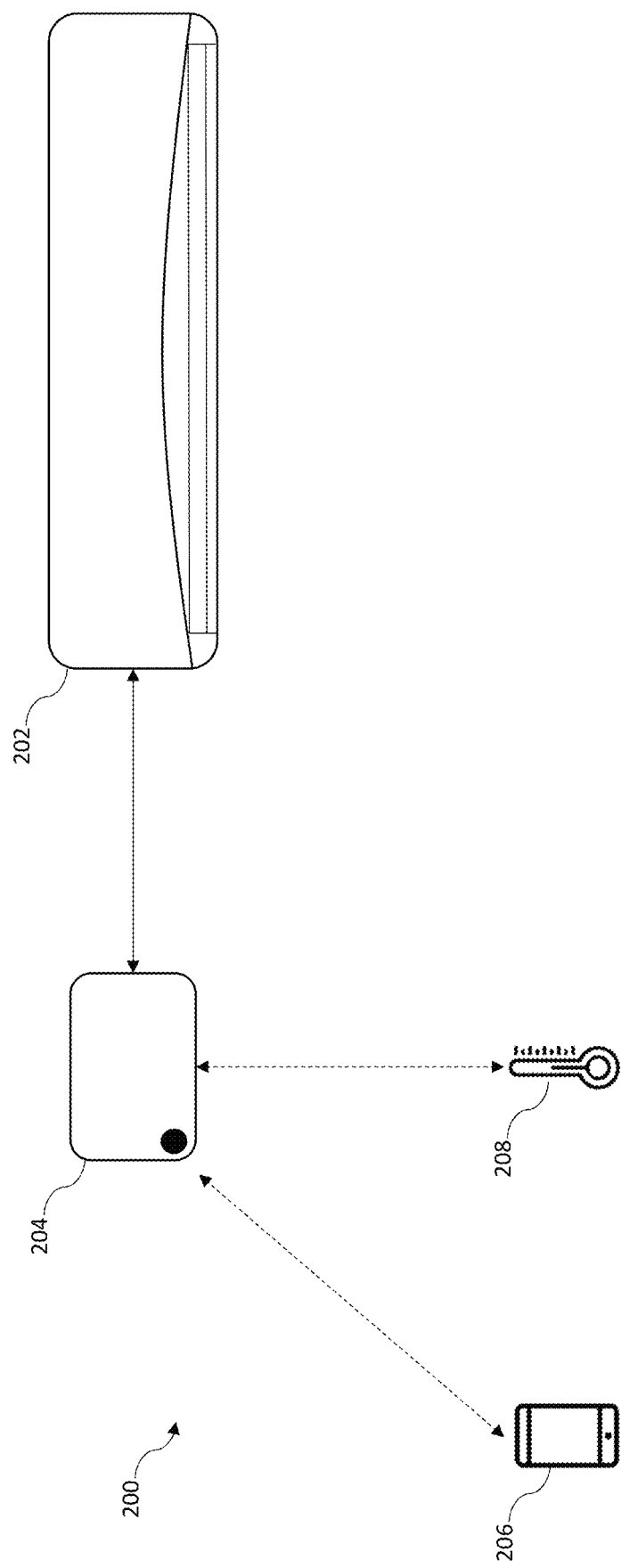

In another implementation of the invention, the controller 204 is directly connected to the temperature maintaining unit 202 as depicted in FIG. 3A.

Referring to FIG. 3B, illustrates a line diagram of the system 200, in accordance with another embodiment of the invention. In this implementation, the temperature maintaining unit 202, the controller 204, the user device 206 and the temperature sensing unit 208 are all communicably connected through the network, as described above, to a remote server 210 that controls the overall operation of temperature control. The server 210 may include at least one processor, an input/output (I/O) interface and a memory (not shown in FIG. 3B). The at least one processor may be implemented as one or more microprocessors, microcomputers, microcontrollers, digital signal processors, central processing units, state machines, logic circuitries, and/or any devices that manipulate signals based on operational instructions. Among other capabilities, the at least one processor is configured to fetch and execute computer-readable instructions stored in the memory.

The I/O interface may include a variety of software and hardware interfaces, for example, a web interface, a graphical user interface, and the like. The I/O interface may allow the server 210 to interact with a user directly or through the user device 206. Further, the I/O interface may enable the server 210 to communicate with other computing devices, such as web servers and external data servers (not shown). The I/O interface can facilitate multiple communications within a wide variety of networks and protocol types, including wired networks, for example, LAN, cable, etc., and wireless networks, such as WLAN, cellular, or satellite. The I/O interface may include one or more ports for connecting a number of devices to one another or to another server.

Figure 4:
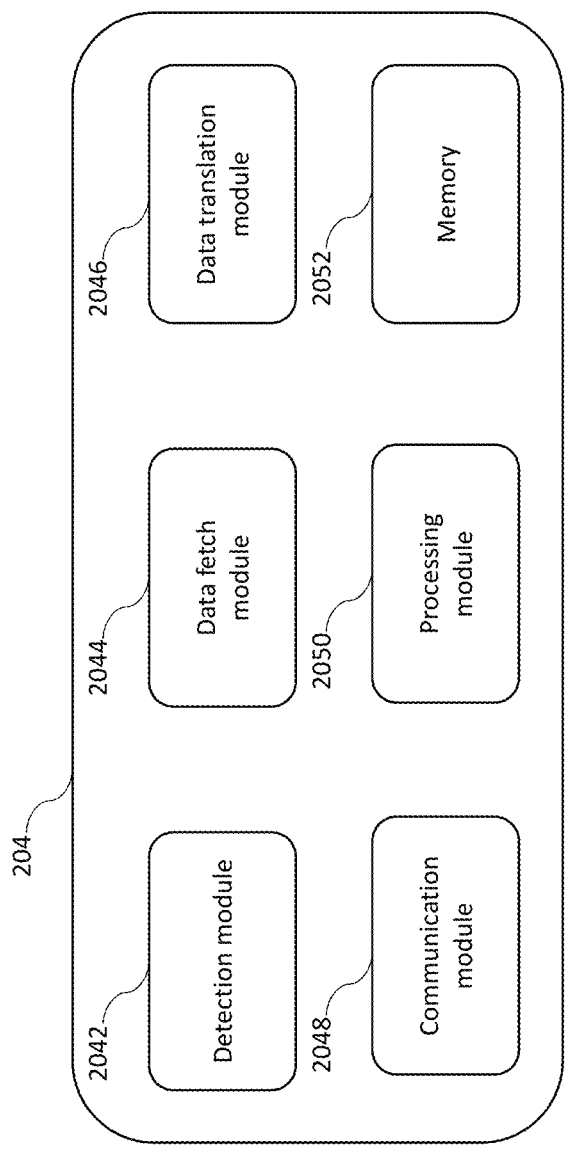
FIG. 4 depicts a block diagram of a controller of the system and its internal components, in accordance with an embodiment of the invention.

Referring to FIG. 4, a block diagram depicting the controller 204 and its internal components and/or modules, in accordance with an embodiment of the invention. The various modules may function in a coordinated manner with each other to achieve coordinated output from the controller 204. The various modules included within the controller 204 are a detection module 2042, a data fetch module 2044, a data translation module 2046, a communication module 2048, a processing module 2050, and a memory 2052.

In an implementation, the modules such as the detection module 2042, the data fetch module 2044, the data translation module 2046, the communication module 2048, and the processing module 2050 may include routines, programs, objects, components, data structure and the like, which perform particular tasks or implement particular abstract data types. The modules may further include modules that supplement applications on the controller 204, for example, modules of an operating system. Further, the modules can be implemented in hardware, instructions executed by a processing unit, or by a combination thereof.

In another implementation, of the present subject matter, the modules as described above may be machine-readable instructions which, when executed by a processor/processing module, perform any of the described functionalities. The machine-readable instructions may be stored on an electronic memory device, hard disk, optical disk or other machine-readable storage medium or non-transitory medium. In an implementation, the machine-readable instructions can also be downloaded to the storage medium via a network connection.

The memory 2052 may include any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The memory may include modules and data. The modules include routines, programs, objects, components, data structures, etc., which perform particular tasks or implement particular abstract data types. The data, amongst other things, serves as a repository for storing data processed, received, and generated by one or more of the modules.

The detection module 2042 is configured to detect the presence of the user device 206 within its vicinity. In an implementation of the invention, the detection module 2042 may include proximity sensors that may detect a presence of at least one user device 206. The proximity sensors may utilize constant signal bursts that may be sent out to detect any user devices. The signals sent out maybe radar signals that may detect the presence of user devices. In other implementation, the signals may be network signals that may detect the presence of user devices from which signals may bounce back. The strength of bounced signals may be calculated and it may be determined that whether any user device like 206 is within a predetermined distance. This may be done by comparing the strength of the signals to a predefined threshold strength defining various distances from the controller 204. In another implementation, the controller 204 may utilize occupancy sensors to sense occupancy. In another implementation, the server 210 may inform the controller 204 about the presence of the user device 206.

The data fetch module 2044 is configured to fetch data for the controller 204. Data may be from the temperature sensing unit 208 or from the user device 206. Data fetch module 2042 performs radio functions and collects all the data. It also may store various data with time stamps within the memory 2052.

The data translation module 2046 is configured to translate the received data into meaningful data that may be interpreted by the controller 204. Hence, it transforms raw data into a data in a format that can be easily understood by the controller 204 and its various modules receiving it.

The communication module 2048 performs the operation of connecting the controller 204 to various other parts of the system 200. It helps in communication and initiation of data exchange between various parts. The communication module 2048 may be a simple two-way radio module.

The processing module 2050 performs the core determination process. It determines which functional parameters need to be altered and by how much value in order to match the personal thermal comfort of the user or users. In case of the presence of multiple users having different personal thermal comfort levels, it also determines a control set point that may satisfy the multiple users present within the space. The processing module 2050 is connected to various actuators that help in altering the functional parameters of the temperature maintaining unit 202.

In operation, the detection module 2042 is connected to the communication module 2048. The detection module 2042 detects the presence of the user device 206 and signals the communication module 2048 to initiate communication with the user device 206. The communication module 2048 is also, further connected to the data fetch module 2044. The communication module 2048 also maintains communication continuously or in short bursts with the temperature sensing unit 208. The data fetch module 2044 fetches the current temperature reading from the temperature sensing unit 208 as and when the communication with the user device 206 is established. The data fetch module 2044 also reads the personal thermal comfort data from the user device 206. The data fetch module 2044 is connected to the data translation module 2046 on one side and to the memory 2052 on the other. The personal thermal comfort data and the temperature along with timestamp and user device 206 details like MAC address etc. may be stored in the memory 2052 to read patterns of presence of the user of the user device 206 within the vicinity.

The data translation module 2046 translates the raw data received and forwards the data to the processing module 2050. The processing module 2052 takes a determination and arrives at a decision of the degree up to which certain functional parameter and the parameter or combination of parameters that are required to be altered.

In an example operation, the controller 204 detects the presence of the user device 206 within its vicinity. The user device 206 stores the preferred thermal comfort level data of the user. This preferred comfort thermal level data may either be manually stored by the user or may be learned by the application residing within the user device 206 as described earlier. The controller 204, then fetches current temperature reading from the temperature sensing unit 208. After receiving the current temperature, the controller 204 compares the preferred thermal comfort level data. Further, the controller 204 determines which functional parameter of the temperature maintaining unit 202 needs to be altered and by how much value. After the determination, the controller 204 using various actuators, alters the determined functional parameter to meet the preferred thermal comfort level of the user.

Referring of FIG. 5, a line diagram of a system for detecting a user device 206 belonging to a user 502 in a space 500 with other components being similar to the system 200 as described in conjunction to FIG. 2A. FIG. 5 will be described in conjunction with FIG. 6A.

Figure 6A:
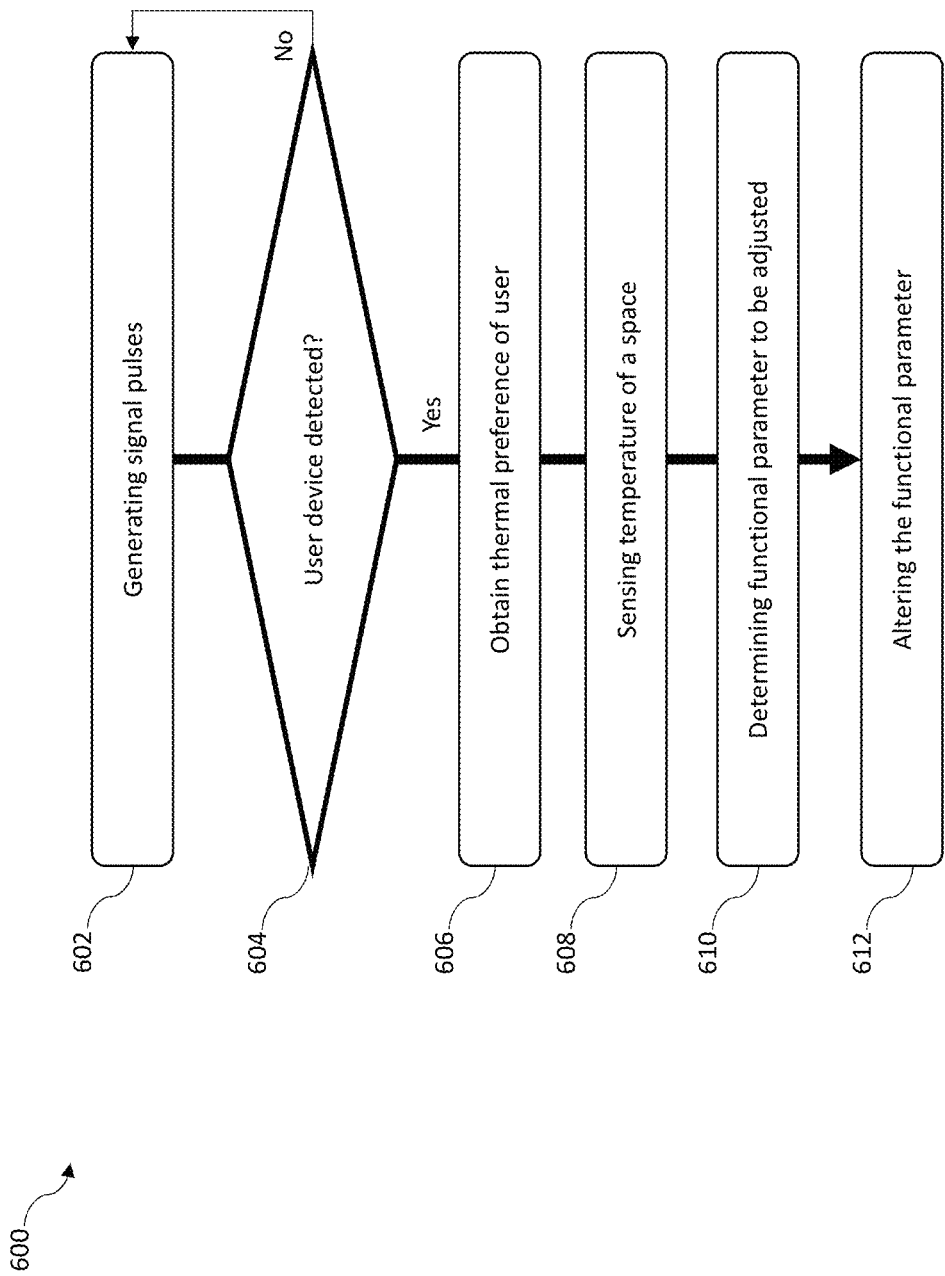
FIG. 6A depicts a flowchart of a method of detecting a user device for automatic control of temperature, in accordance with another embodiment of the invention.

Referring to FIG. 6A, a flow diagram illustrating a method 600 of automatic control of temperature in the space 500. The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

At step 602, the controller 204 sends out periodic bursts of signals to detect the presence of at least one user device 206. At step 604, it is determined whether there is any user device 206 present within the vicinity or not. The detection of the user device 206 may be done on the basis of the signal strength as explained before. If there is no user device 206 detected, then the method returns back to step 602 of generating signals. However, if there is a user device 206 detected within the vicinity, the method 600 at step 606 obtains thermal preference data of the user 502. The thermal preference data of the user 502 may be stored within the application memory of the user device 206.

Figure 6B:
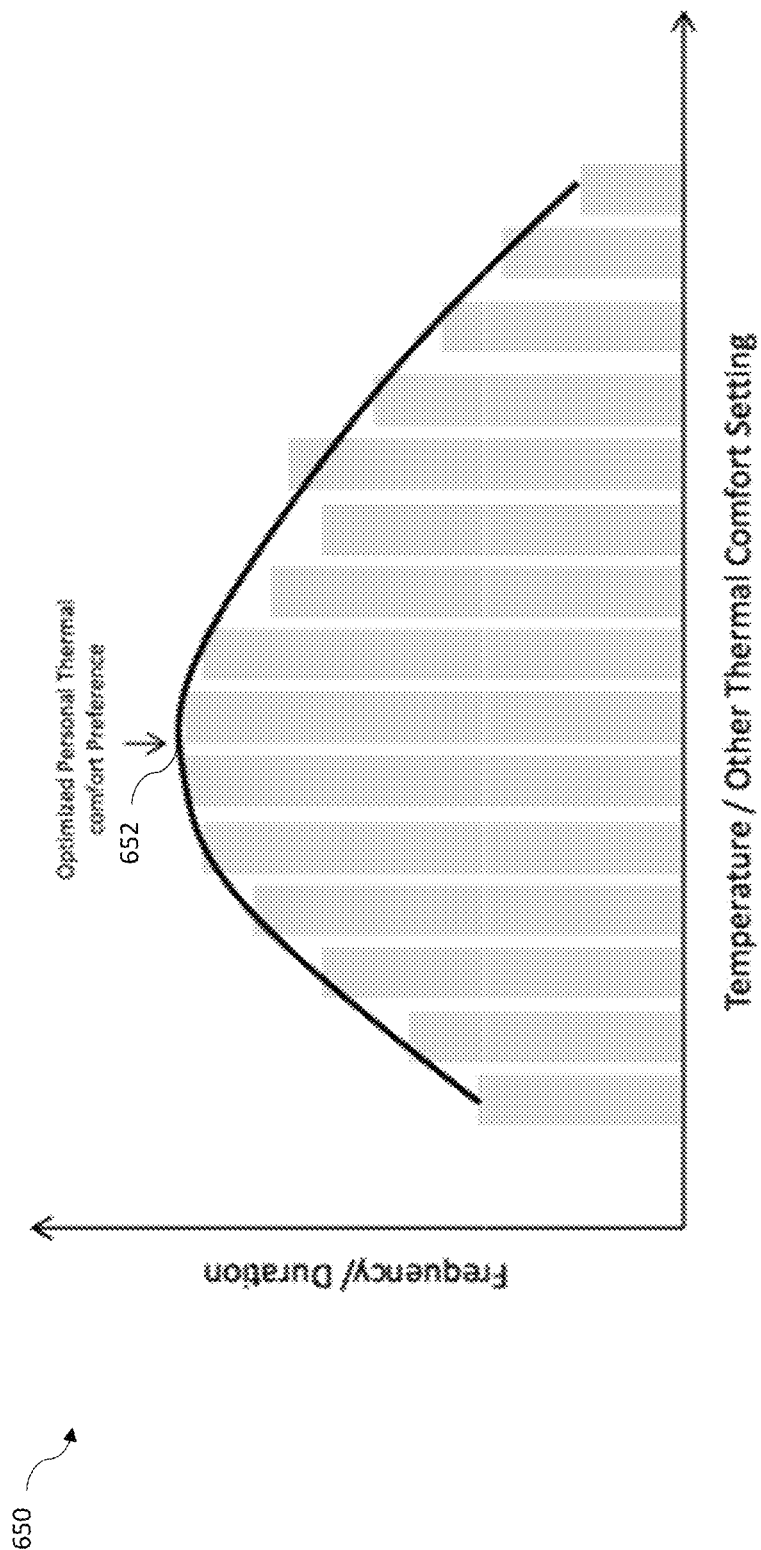
FIG. 6B depicts a line chart depicting the determination of optimized personal thermal comfort preference, in accordance with an embodiment of the invention.

Referring to FIG. 6B, a line chart 650 depicting determination of an optimized personal thermal comfort preference point for a user 502, in accordance with an exemplary embodiment of the invention. The line chart 650 is a function of temperature/other thermal comfort settings, on the x-axis and frequency/duration, on the y-axis. The line chart 650 calculates which temperature or any other thermal setting has been set or used for the maximum duration and for the maximum number of times and determines that as the optimized personal thermal comfort preference data point 652. The optimized personal thermal comfort preference data 652 may be temperature setting, airflow setting, fan power setting, duration of cooling setting, ventilation settings and the like.

Referring back to FIG. 6A, at step 608, the temperature of the space 500 is sensed. The temperature may be sensed continuously or in short intervals of time. The thermal preference data may then be compared to the current temperature as sensed and at step 610, may be utilized to determine the functional parameter to be adjusted based on the thermal preference data. After determining the functional parameter, at step 612, the functional parameter is altered to suit the thermal preference data of the user 502. For an example, if the space 500 is serviced by a split air conditioner. The controller 204 will connect with the temperature sensing unit 208 to capture current temperature on detection of the user device 206 termed as a mobile phone for the sake of ease of explanation. The mobile device 206 stores the preferred temperature values of the user 502. In case the current temperature of the space 500 is more than the preferred thermal level of the user 502, the controller 204 will increase the airflow and decrease the operable temperature of the air conditioner to a value that suits the user thermal comfort level. Airflow may be increased by increasing fan power whereas temperature can be decreased increasing compression level of the air conditioner.

Figure 7:
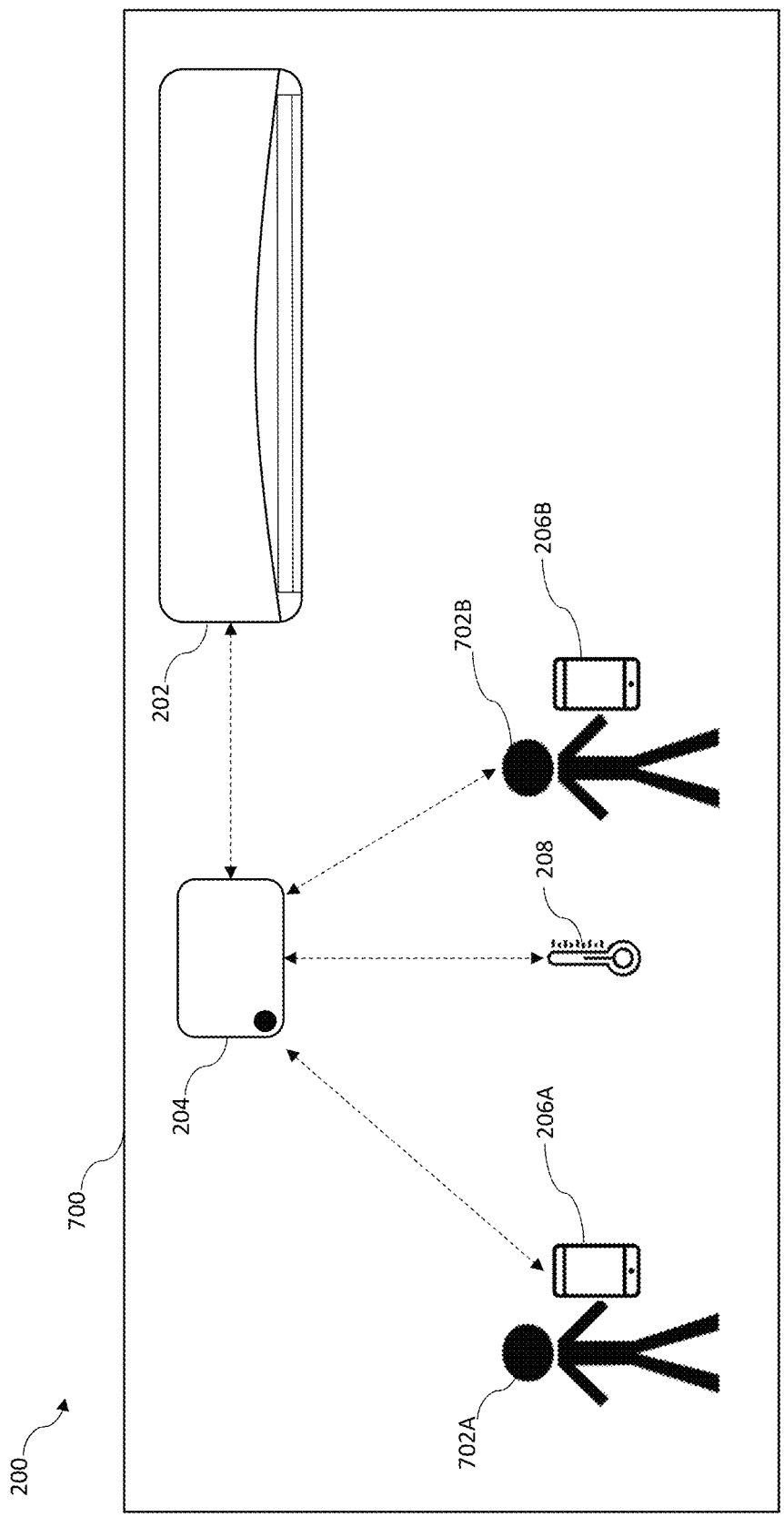
FIG. 7 depicts a line diagram of a system for detecting multiple user devices for automatic control of temperature, in accordance with another embodiment of the invention.

Referring to FIG. 7, a line diagram of the system 200 for detecting multiple user 702A, 702B with their respective user devices 206A and 206B within a space 700 for its automatic temperature control is depicted, in accordance with an embodiment of the invention. FIG. 7 will be described in conjunction with FIG. 8.

Referring to FIG. 8A, a flow diagram illustrating a method 800 of automatic control of temperature in the space 700, in accordance with another embodiment of the invention. The order in which the method is described is not intended to be construed as a limitation, and any number of the described method blocks can be combined in any order to implement the method or alternate methods. Additionally, individual blocks may be deleted from the method without departing from the spirit and scope of the subject matter described herein.

At step 802, the controller 204, generates signal pulses at short intervals of time, to detect the presence of user devices 206A, and 206B and their corresponding users 702A and 702B within its vicinity. At step 804, the controller 204 determines, whether there is any user device detected or not. If no device is detected, the method 800 returns back to step 802. However, if the controller 204 determines the presence of user devices, at step 806, it further determines that whether there is a single user device or multiple user devices like 206A and 206B.

If the controller 204 determines the presence of multiple users 702A and 702B through detection of their user devices 206A and 206B, then at step 808, the controller obtains thermal preference data of the users 702A and 702B by communicating with their corresponding user devices 206A and 206B. The thermal preference data of different users may be different. Further, at step 810 the controller 204, communicates with the temperature sensing unit 208 to sense the current temperature of the space 700. The temperature may be sensed continuously or in short intervals of time. At step 812, the controller 204, determines a control set point for all users based on firstly the current temperature of the space 700 and secondly the thermal preference levels of the different users.

Figure 8B:
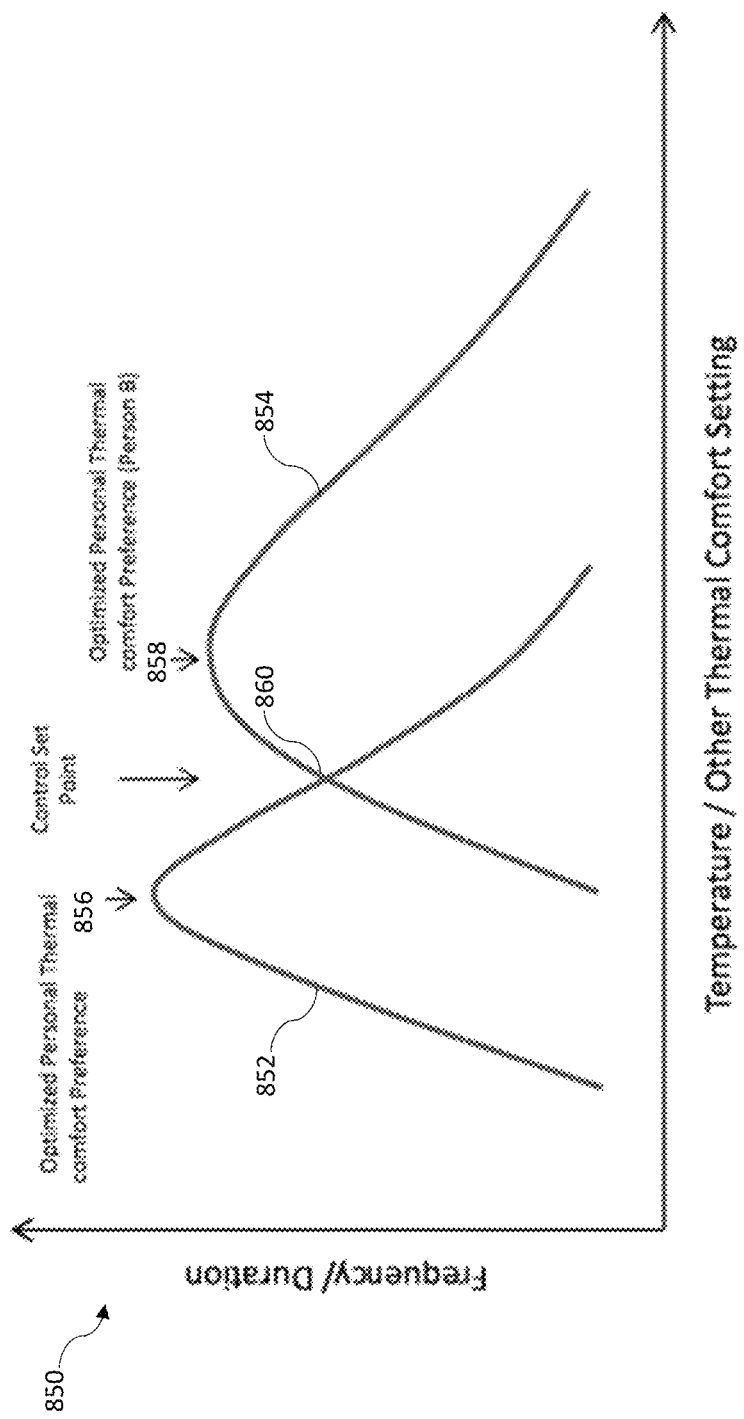
FIG. 8B depicts a line chart depicting control setpoint selection, in accordance with an embodiment of the invention.

Referring to FIG. 8B, a line chart 850 depicting control point 860 selection, in accordance with an exemplary embodiment of the invention. The line chart 850, as depicted is a function of frequency/duration, and temperature/other thermal comfort settings. The line chart 850 depicts the duration or the frequency for which a particular user has set a specific temperature as also described in conjunction to line chart 650 as described in FIG. 6B. The line chart 850 displays thermal setting curve 852 and 854 for corresponding users 702A and 702B. The thermal settings may be recorded by the application running on the user device 206A and 206B respectively or in a remote server just as like server 210 described earlier. The application running on the user device 206A and 206B determines the optimal personal thermal comfort preference point for both the users 702A and 702B. As described earlier, the thermal comfort preference point is determined by calculating which temperature or any other thermal setting has been set or used for the maximum duration and for the maximum number of times. For user 702A point shown as 856, and for user 702B point shown as 858 is determined as the thermal comfort preference points. The controller 204, determines the control set point that may satisfy both the users 702A and 702B. In an exemplary embodiment, this control set point 860 may be a place where both the curves, that are curve 852 and curve 854, intersect each other. However, there may be other ways of identifying the control set point 860 and the above-mentioned example need not be considered as limiting to the scope of the invention in any manner.

Referring back to FIG. 8A, after the control set point 860 has been determined, at step 814 the controller 204 determines which functional parameter of the temperature maintaining unit 202 needs to be altered in order to meet the control set point of thermal comfort preference for both the users 702A and 702B. Further at step 816, the functional parameter(s) to be adjusted are altered to satisfy the control setpoint 860.

In an exemplary operation, if the space 700 is conditioned by a split type air conditioner with adjustable air flow rate controlled by fan motor and direction controlled by air louver. Further, current temperature reading for the space 700 is at 24° C. In a scenario when two users 702A and 702B enter the space 700, with preference temperature of 20° C.

and 26° C. respectively, the controller 204, will determine the functional parameter to be altered, in this case, the controller 204 automatically directs chilled air flow towards 702A while it further adjusts the air flow rate to maintain the most comfortable level between 702A and 702B.

Referring back to step 806 in case only a single user is detected, the method 800 follows further steps as similar to the steps described in method 600. For ease of description, it is assumed that only user 702A is detected with user device 206A. The method 800 at step 818 obtains thermal preference data of the user 702A. The thermal preference data of the user 702A may be stored within the application memory of the user device 206A. At step 820, the temperature of the space 700 is sensed. The thermal preference data may then be compared to the current temperature as sensed and at step 822, may be utilized to determine the functional parameter to be adjusted based on the thermal preference data. After determining the functional parameter, at step 816, the functional parameter is altered to suit the thermal preference data of the user 702A.

Figure 9:
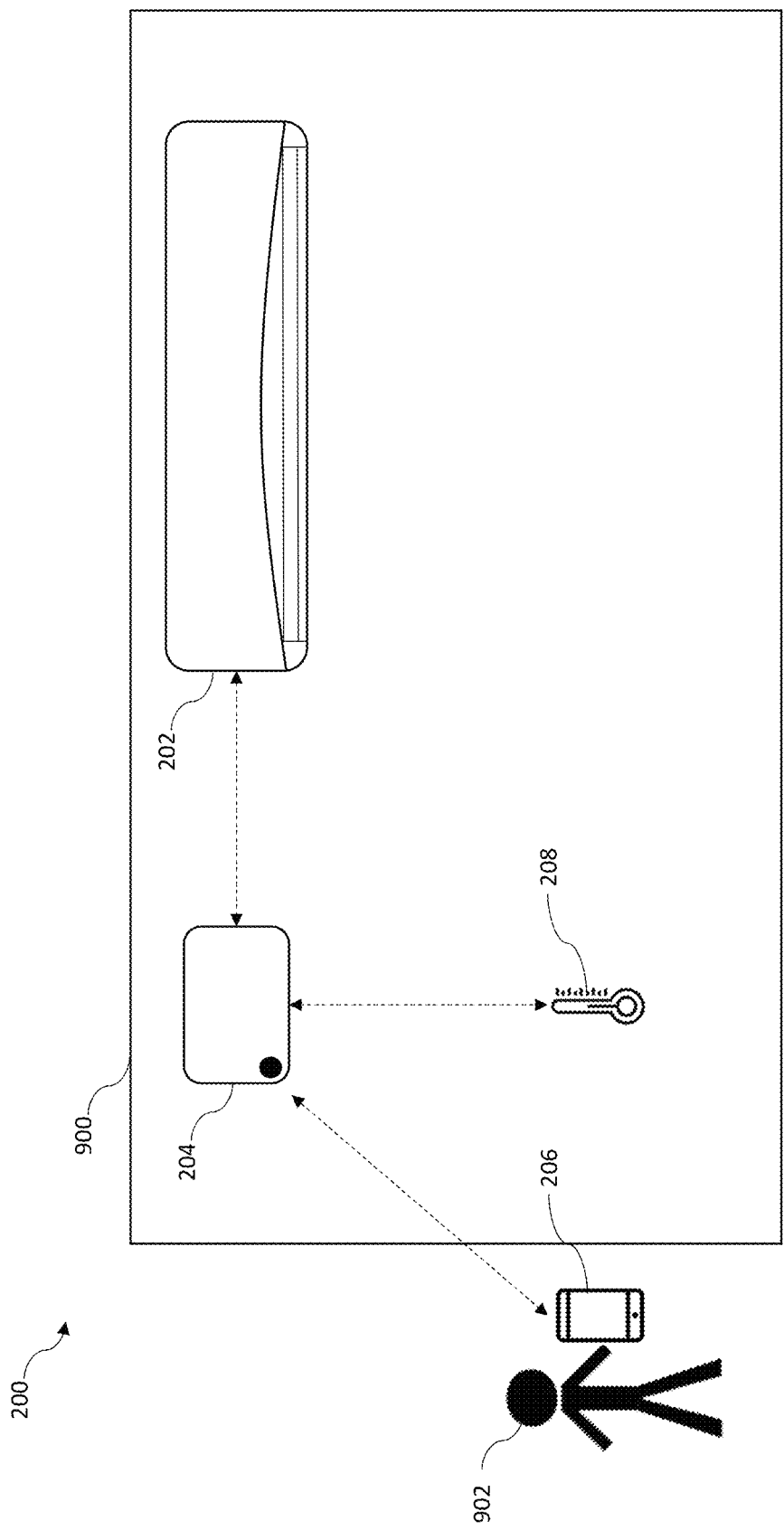
FIG. 9 depicts a line diagram of a system for detecting an absence of a user, in accordance with another embodiment of the invention.

Referring to FIG. 9, a line diagram of the system 200 for detecting an absence of a user 902 and its corresponding user device 206 from a space 900, in accordance with an exemplary embodiment of the present invention with other components being similar to the system 200 as described in conjunction to FIG. 2A. FIG. 9 will be described in conjunction with FIG. 10.

Figure 10:
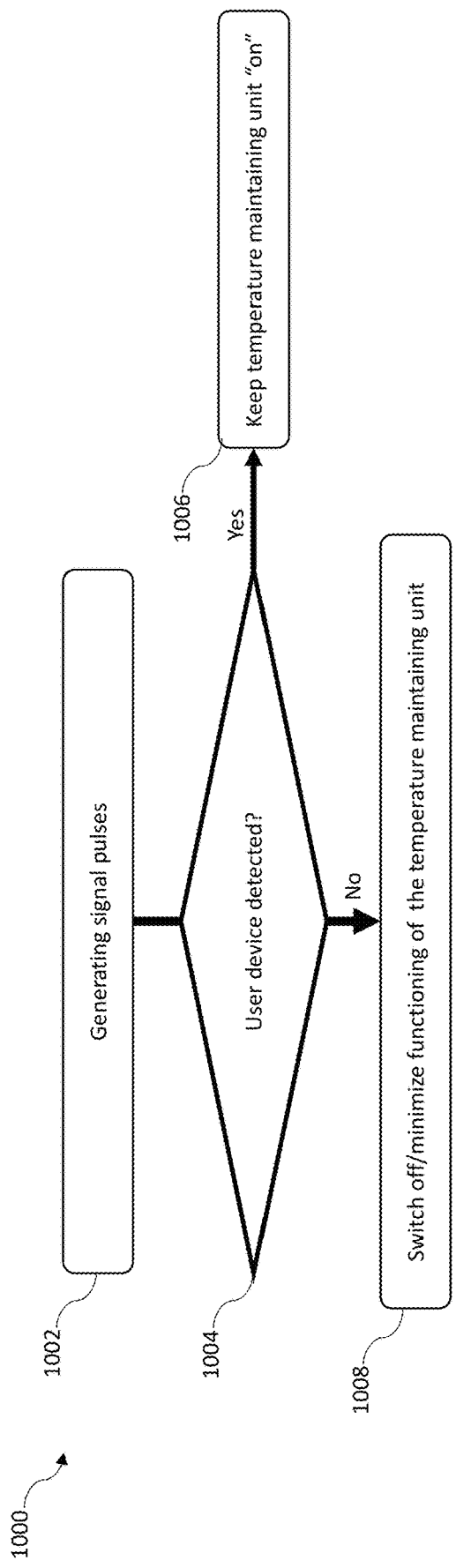
FIG. 10 depicts a flowchart of a method for detecting an absence of a user, in accordance with another embodiment of the invention.

Referring to FIG. 10, a flowchart of a method 1000 for controlling of airflow of the temperature maintaining unit 202 after detecting the absence of the user 902 from the space 900, in accordance with an embodiment of the invention. According to one embodiment of the invention, the absence of the user 902 may be detected by using a simple occupancy sensor (not shown in the figure) that may be either integrated within the temperature maintaining device 202 or may be integrated within the controller 204. The occupancy sensor detects presence or absence of a human being within a specific area. In another embodiment of the invention, the signal strength of the user device 206 communicating with the controller 204 may be continuously monitored. In an embodiment of the invention, a geofencing algorithm may be defined based on the signal values. For example, for a signal strength value of X dBs, the controller 204 may classify user device 206 to be within the space 900. However, if the signal strength is less than the value X dBs the controller 204 may mark the user device 206 to be outside the space 900 or not present within the vicinity.

In method 1000, at step 1002 the controller 204 may continuously send out signal pulses and keep checking signal strengths of communicating user devices 206 within the vicinity of the space as described above. Further, at step 1004 it is determined, by the controller 204, whether the user device 206 that was present within the space 900 is still present or not. In case the user device 206 is still present, the controller 204 will keep the temperature maintaining unit 202 functioning and will maintain the temperature as well.

However, if the user device 206 is determined to be not present within the space 900, at step 1008, the controller 204 will halt or minimize the functioning of the temperature maintaining unit 202 in order to reduce the energy consumption.

In an embodiment of the invention, the controller 204 may halt the functioning of the temperature maintaining unit 202 immediately after there the user device 206 is not detected. In another embodiment of the invention, the controller 204 may halt the functioning of the temperature maintaining unit 202 after a pre-defined time period. The pre-defined period may be set by a user itself or may be defined by the system itself according to the usage of the space 900 by its occupants. For example, a conference room will have a higher pre-defined time period when compared to a small meeting room etc.

Referring to FIG. 11A-11C, line diagrams depicting controlling of the temperature maintaining unit 202 for automatic temperature control, in accordance with an exemplary embodiment of the invention. In the exemplary embodiment, it is provided that there is only one user device 206 detected and the temperature is maintained according to the preferred comfort level of a user of the user device 206.

As depicted in FIG. 11A, the preferred temperature level of the user is 24 degrees Celsius. The damper 1104 may be controlled by a connected actuator (not shown in the figure) to move the air louver 1102. The actuator can change the position of the damper 1104 of the temperature maintaining unit 202, which may increase or decrease the amount of conditioned air flowing through the air duct.

In FIG. 11A, when the air temperature sensor 208, that is connected to a user device 206, detects a low temperature, as shown on the screen of the user device 206, the actuator controls air volume control damper 1102 to reduce the opening of an air louver 1102.

In FIG. 11B, when the air temperature sensor 208, that is connected to a user device 206, detects a rise in temperature, as shown on the screen of the user device 206, the actuator controls air volume control damper 1104 to enlarge the opening of an air louver 1102.

In FIG. 11C, when the air temperature sensor 208, that is connected to a user device 206, detects a rise in temperature, as shown on the screen of the user device 206, the actuator controls air volume control damper 1104 to further enlarge the opening of an air louver 1102 for increases air flow.

Figure 12:
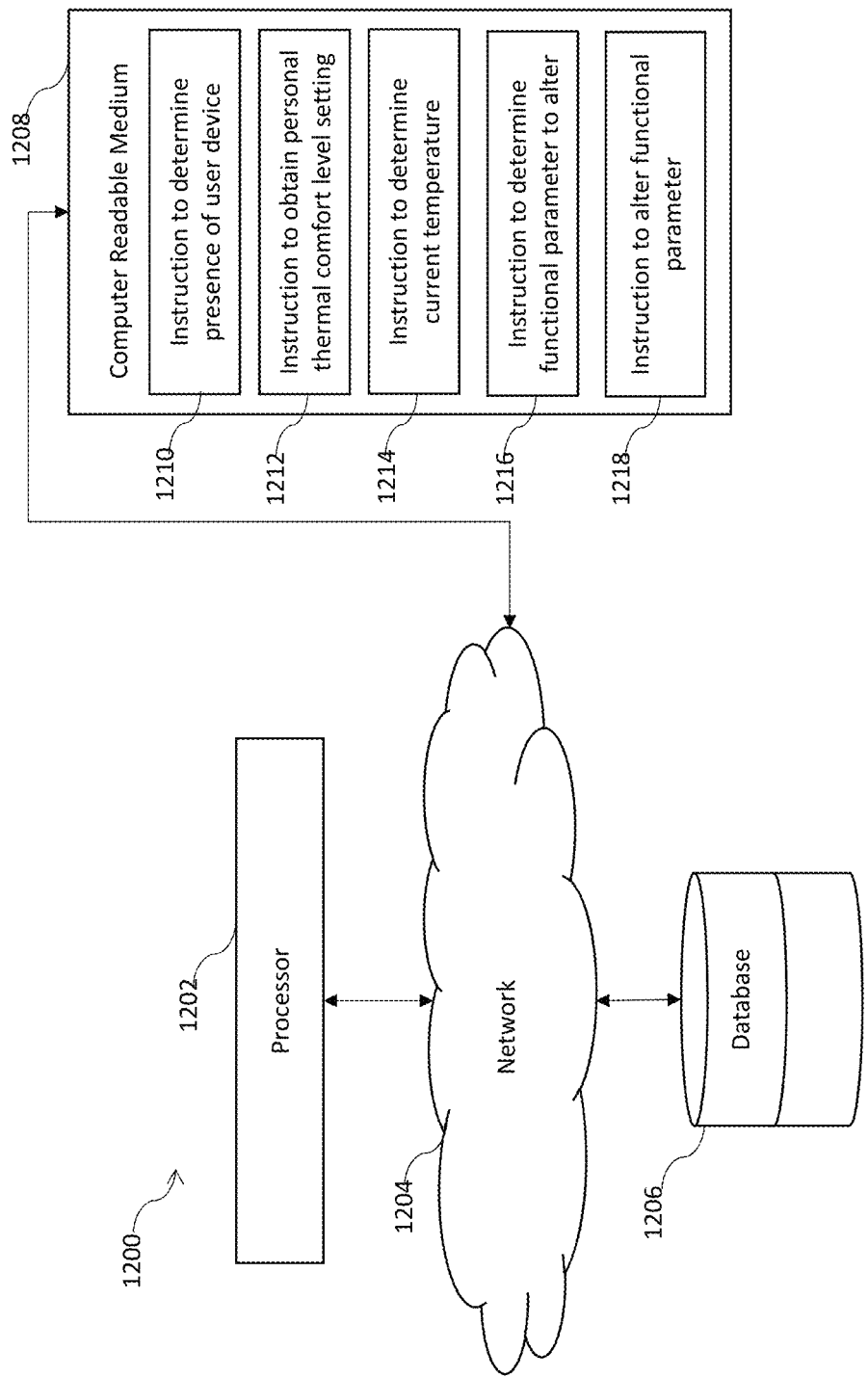
FIG. 12 depicts an exemplary computer system, in accordance with an embodiment of the embodiment.

Referring to FIG. 12 illustrates an exemplary computer system 1200 for implementing various embodiments is disclosed. The computer system 1200 may comprise a central processing unit ("CPU" or "processor") 1202. The processing unit 1202 may comprise at least one data processor for executing program components for executing user- or system-generated requests. The processing unit 1202 may include specialized processing units such as integrated system (bus) controllers, memory management control units, floating point units, graphics processing units, digital signal processing units, etc. The processing unit 1202 may be implemented using the mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

In some embodiments, the processing unit 1202 may be disposed of in communication with a communication network 1204 via a network interface (not shown in the figure). The network interface may communicate with the communication network 1204. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1204 may include, without limitation, a direct interconnection, local area network (LAN), wide area network (WAN), a wireless network (e.g., using Wireless Application Protocol) etc.

In some embodiments, the processing unit 1202 may be disposed of in communication with one or more databases 1206 (e.g., a RAM, a ROM, etc.) via the network 1204. The network 1204 may connect to the database 1206 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The processing unit 1202 may also be disposed of in communication with a computer readable medium 1208 (e.g. a compact disk, a USB drive, etc.) via the network 1204. The network 1204 may connect the computer readable medium 1208 including without limitation, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium. The computer-readable medium 1208 may be processed by the computer system 1200 or in any other computer system. The computer-readable medium 1208 may include instructions like an instruction to determine a presence of user device 1210, instruction to obtain personal thermal comfort level setting 1212, instruction to determine current temperature of space 1214, instruction to determine a functional parameter to be altered 1216, or instructions to alter functional parameter 1218.

Referring to FIG. 13A-13D, depict line diagrams of various screens and landing pages of the software application (as described above) installed on a user device 206, for providing manual control input to the temperature maintaining unit 202, in accordance with an exemplary embodiment of the invention.

The software application may be pre-installed or may be readily downloaded and installed from application stores like Play Store™, AppStore™ etc. The software application may have a splash screen that may be displayed to the user once invoked. The splash screen may be followed by a landing page 1302, that may indicate with a heading 1304 about the screen. For example, the landing page 1302 opens a screen for HVAC equipment control as indicated by 1304. The screen 1304 may include various different input areas that are configured to receive inputs from the user. The input areas may be touch inputs that receive touch gestures of the user or they may be configured to be initiated by physical buttons like a joystick input or a stylus as well. The screen 1304, depicts an exemplary arrangement of icons and are not be considered restrictive in any manner to the scope of the invention. The screen 1304 depicts various icons and text indicators of the icons. For example, icon 1306 for increasing airflow and textual indicator titled "Increase air flow" 1308. There is also provided icon 1310 for decreasing air flow and textual indicator titled "Decrease air flow" 1312. Icon 1314 is provided for increasing temperature and textual indicator titled "Increase temperature" 1316. There is also further provided icon 1318 for decreasing temperature and textual indicator titled "Decrease temperature" 1320. In an embodiment of the invention only icons 1306, 1310, 1314, and 1318 are active. In another implementation, only the textual indicators 1308, 1312, 1316, and 1320 are active and may be invoked. Furthermore, in yet another embodiment of the invention, both the icons 1306, 1310, 1314, and 1318 and textual indicators 1308, 1312, 1316, and 1320 are active and may be invoked.

Figure 13A:
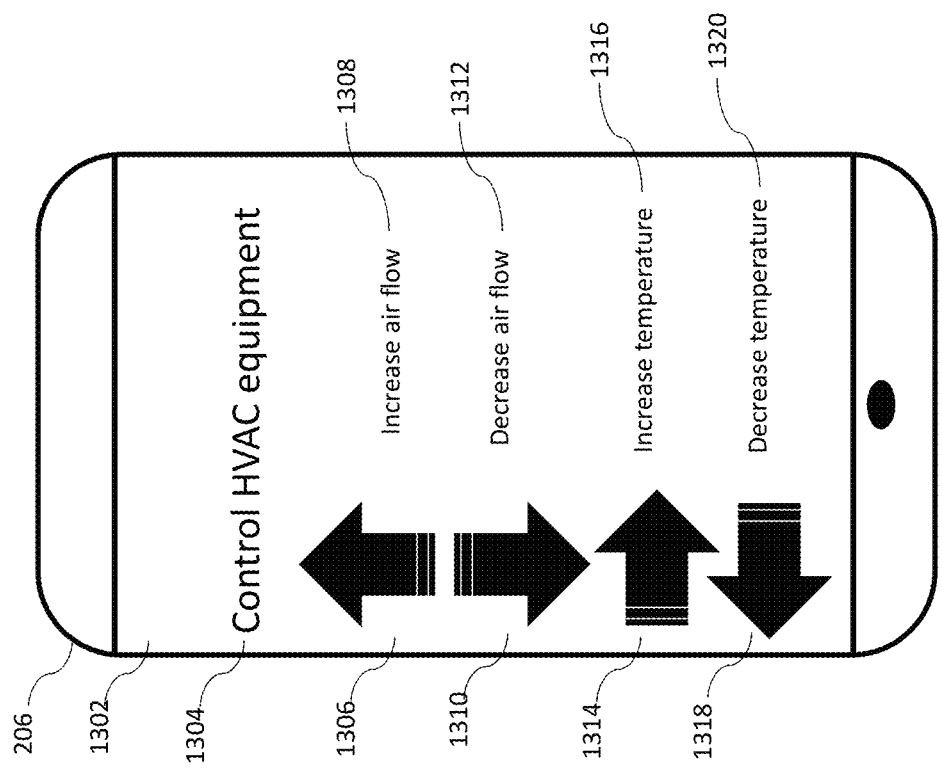
FIG. 13A-13E depicts several screens of an application for automatic temperature control in a space, in accordance with an embodiment of the invention.
Figure 13B:
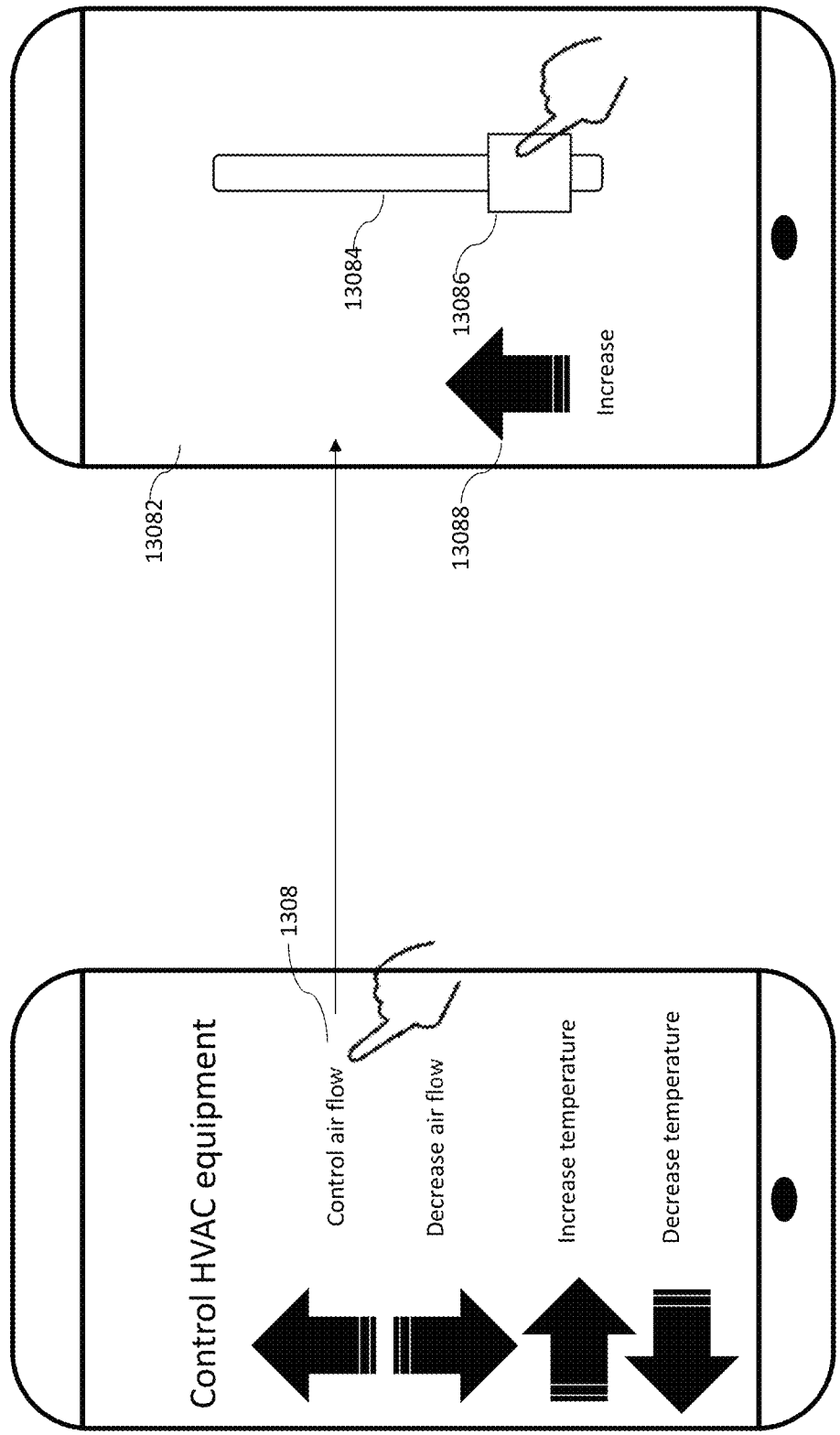

Referring to FIG. 13B, line diagram of various screens and landing pages of the software application (as described above) installed on a user device 206, for providing manual control input to the temperature maintaining unit 202, in accordance with an exemplary embodiment of the invention. For ease of description, in the following description, it is assumed that the input received from the user is through a touch input. The user can invoke increasing of air flow by parameter receiving a touch input like a finger touch. The input can be provided by either touching the graphic icon 1306 or the textual indicator 1308. For sake of ease, it is assumed that the parameter is accessed using the textual indicator.

The user may touch the "increase air flow" 1308 and invoke a new landing page 13082 to take care of increasing air flow. For the same functioning, landing page 13082 may further include a graphic icon 13088 to indicate an increase in air flow. The landing page may further include a graphics slider bar 13084. The graphics slider 13084 bar may further include a graphics slider 13086. For increasing the air flow, the user may slide the slider 13086 up using a finger. As and when the slider 13086 moves up, the application communicates with the controller 204 to move the actuator in order to increase the air flow of the temperature maintaining unit 202 that may be an air conditioner in an embodiment.

Figure 13C:
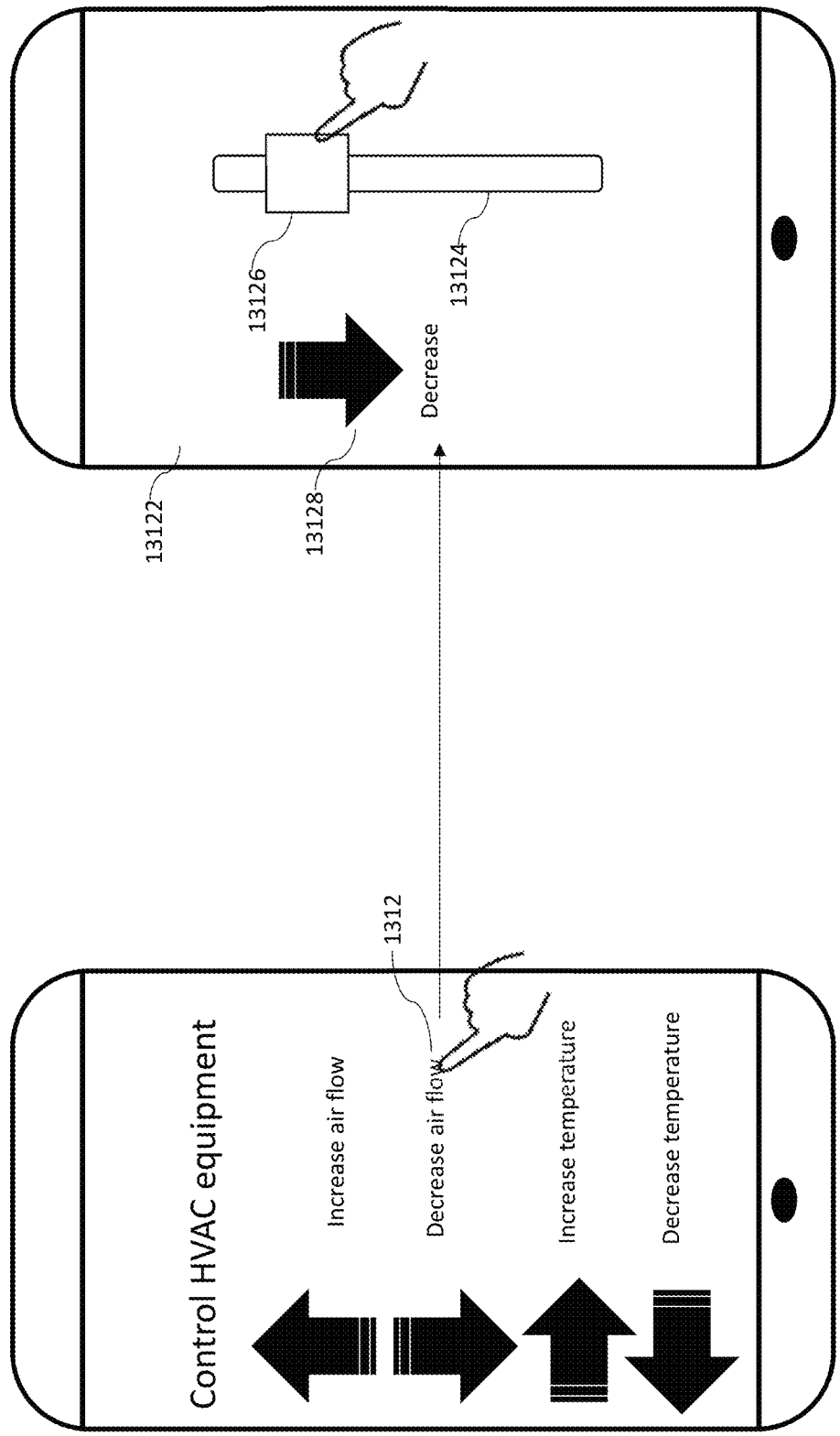

Referring to FIG. 13C, line diagram of various screens and landing pages of the software application (as described above) installed on a user device 206, for providing manual control input to the temperature maintaining unit 202, in accordance with an exemplary embodiment of the invention. For ease of description, in the following description, it is assumed that the input received from the user is through a touch input. The user can invoke decreasing of air flow by parameter receiving a touch input like a finger touch. The input can be provided by either touching the graphic icon 1310 or the textual indicator 1312. For sake of ease, it is assumed that the parameter is accessed using the textual indicator.

The user may touch the "decrease air flow" 1312 and invoke a new landing page 13122 to take care of decreasing air flow. For the same functioning, landing page 13122 may further include a graphic icon 13128 to indicate a decrease in air flow. The landing page may further include a graphics slider bar 13124. The graphics slider bar 13124 may further include a graphics slider 13126. For decreasing the air flow, the user may slide the slider 13126 down using a finger. As and when the slider 13126 moves up, the application communicates with the controller 204 to move the actuator in order to decrease the air flow of the temperature maintaining unit 202 that may be an air conditioner in an embodiment.

Figure 13D:
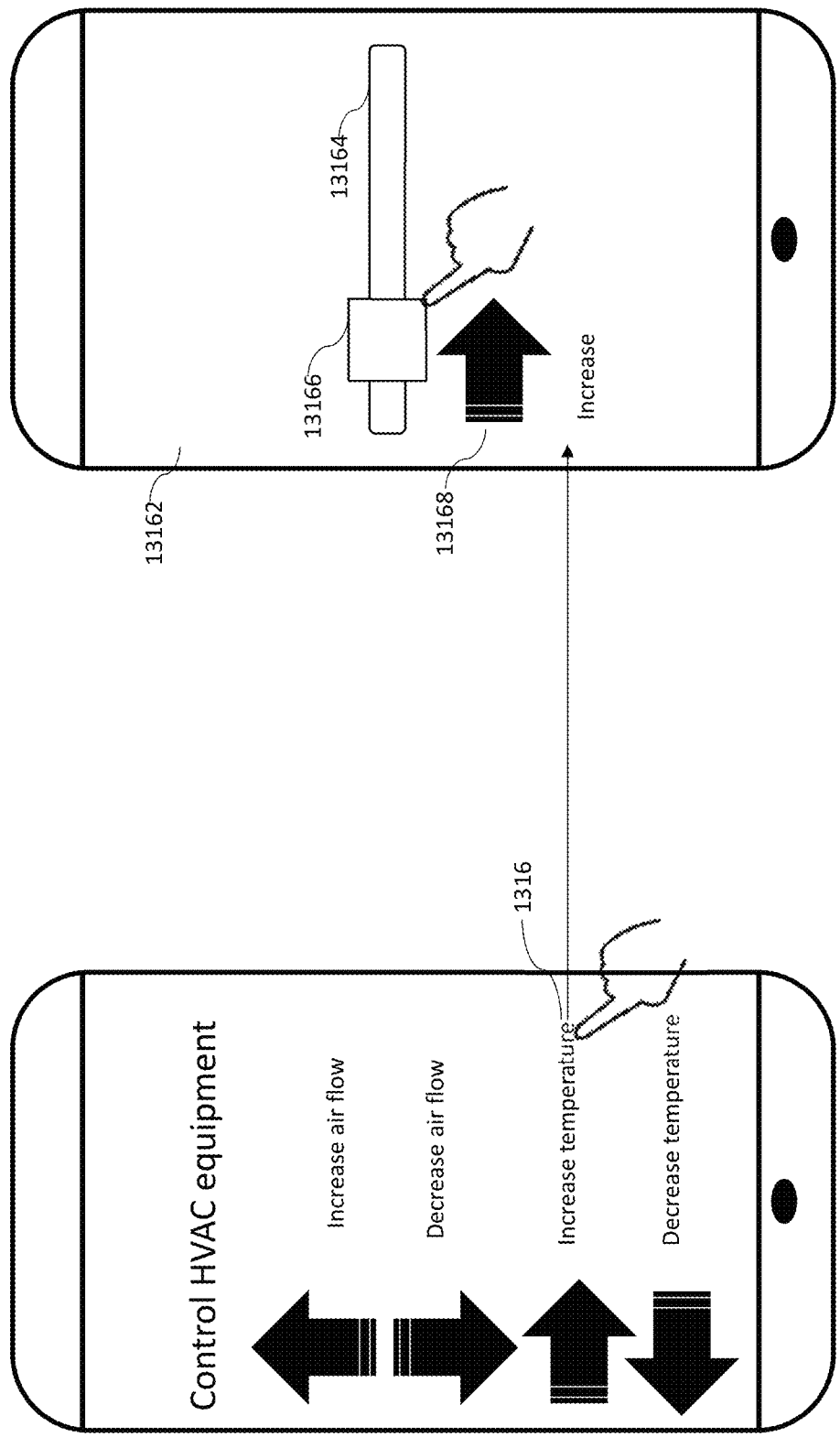

Referring to FIG. 13D, line diagram of various screens and landing pages of the software application (as described above) installed on a user device 206, for providing manual control input to the temperature maintaining unit 202, in accordance with an exemplary embodiment of the invention. For ease of description, in the following description, it is assumed that the input received from the user is through a touch input. The user can invoke the increasing of temperature by parameter receiving a touch input like a finger touch. The input can be provided by either touching the graphic icon 1314 or the textual indicator 1316. For sake of ease, it is assumed that the parameter is accessed using the textual indicator.

The user may touch the "increase temperature" 1316 and invoke a new landing page 13162 to take care of increasing temperature. For the same functioning, landing page 13162 may further include a graphic icon 13168 to indicate an increase in temperature. The landing page may further include a graphics slider bar 13164. The graphics slider bar 13164 may further include a graphics slider 13166. For increasing the temperature, the user may slide the slider 13166 rightwards using a finger. As and when the slider 13166 moves right, the application communicates with the controller 204 to increase the temperature by the temperature maintaining unit 202 that may be an air conditioner in an embodiment.

Figure 13E:
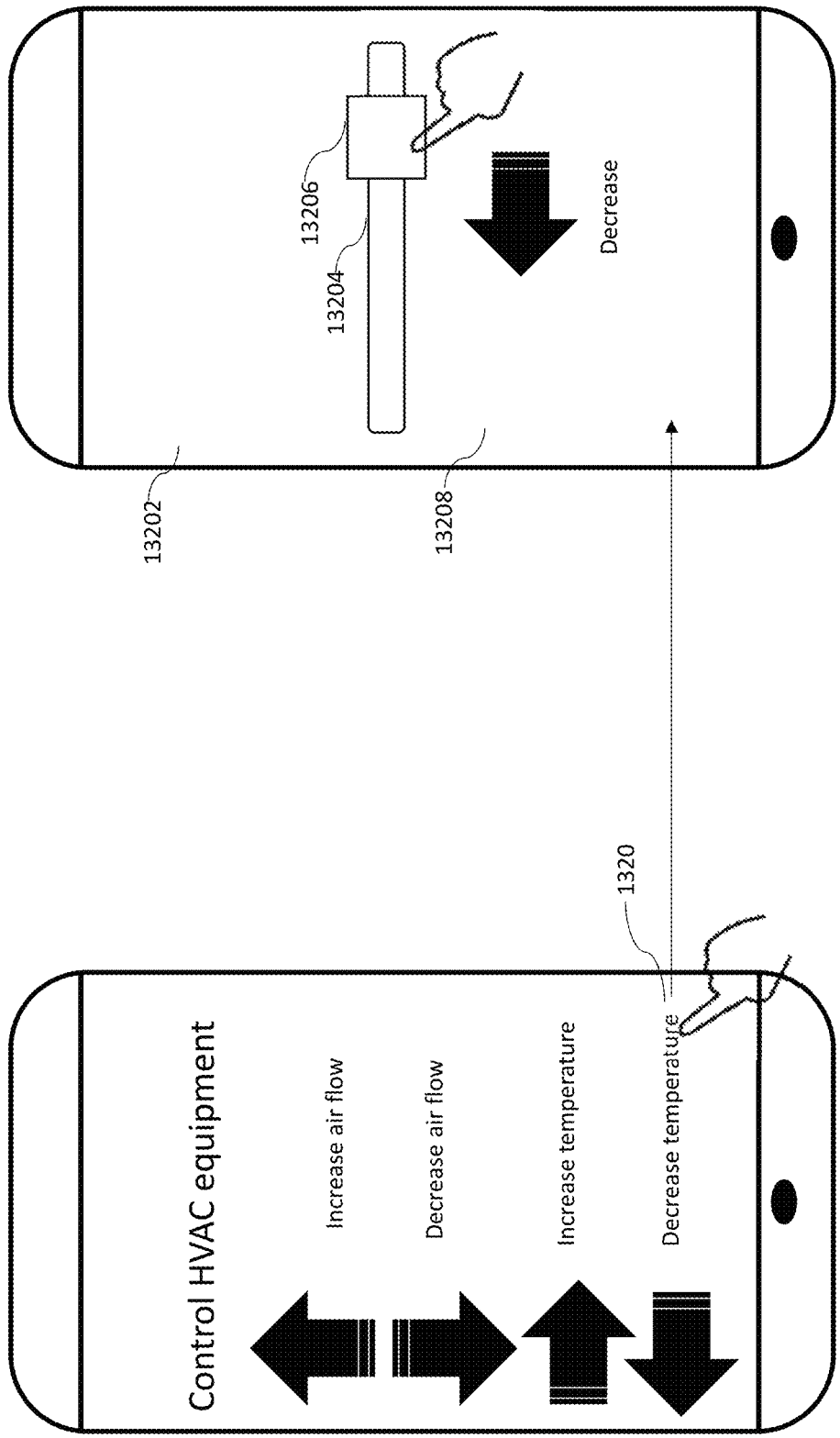

Referring to FIG. 13E, line diagram of various screens and landing pages of the software application (as described above) installed on a user device 206, for providing manual control input to the temperature maintaining unit 202, in accordance with an exemplary embodiment of the invention. For ease of description, in the following description, it is assumed that the input received from the user is through a touch input. The user can invoke decreasing of temperature by parameter receiving a touch input like a finger touch. The input can be provided by either touching the graphic icon 1318 or the textual indicator 1320. For sake of ease, it is assumed that the parameter is accessed using the textual indicator.

The user may touch the "decrease temperature" 1320 and invoke a new landing page 13202 to take care of decreasing temperature. For the same functioning, landing page 13202 may further include a graphic icon 13208 to indicate a decrease in temperature. The landing page may further include a graphics slider bar 13204. The graphics slider bar 13204 may further include a graphics slider 13206. For decreasing the temperature, the user may slide the slider 13206 leftwards using a finger. As and when the slider 13206 moves left, the application communicates with the controller 204 to decrease the temperature by the temperature maintaining unit 202 that may be an air conditioner in an embodiment.

It is to be noted that the above screens may be integrated to only a single screen or multiple control functions may be incorporated within one single screen. For example, the increasing and decreasing of air flow may be provided on a single screen with a single slider bar and slider. Similarly, the increasing and decreasing of temperature may also be provided on a single screen with a single slider bar and slider. It is also possible to consolidate the various functional parameters controlling features like increasing and decreasing of air flow and increasing and decreasing of temperature within a single screen as well.

It is also to be noted that for ease of description the above exemplary screens FIG. 13A-13E disclose touch inputs from the user. There may be other ways of inputs like hardware buttons, stylus input, or joystick inputs that may also be utilized. The above exemplary embodiments are not to be determined restrictive for the scope of the invention in any manner. The control of the functional parameters, when manual inputs are provided by the user, happens in real time. The controller 204 may utilize various kinds of individual modules for controlling functional parameters. For controlling the air louver to regulate and move airflow, the controller 204 may utilize servo motors like DC servo motor, AC servo motor, positional servo motor etc. For controlling the power of fan of the temperature maintaining unit 202, the controller 204 may utilize a regulator. The regulator may utilize a pulse width modulation (PWM) technique. The fan power may also be regulated using a motor as well. The control of fan power may also be done using a direct digital control system generally utilized to control HVAC systems. For controlling the temperature, the controller 204 may use a thermostat. The thermostat maintains the temperature set by the user. For controlling humidity within a space, the controller 204 may utilize a humidifier or a dehumidifier to increase or decrease humidity settings within the space. For other controls, suitable modules are utilized to provide efficient control.

The applications described above are some examples of a wide range of applications applicable by the smart lighting system of the present patent application in vehicles and relate to providing improved lighting solutions. The described smart lighting system can be designed and built in other forms and be utilized, including but not limiting to the presently disclosed applications, in other industrial and commercial areas.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described above, the method may be considered to be implemented in the above-described system and/or the apparatus and/or any electronic device (not shown).

The above description does not provide specific details of the manufacture or design of the various components. Those of skilled in the art are familiar with such details, and unless departures from those techniques are set out, techniques, known, related art or later developed designs and materials should be employed. Those in the art are capable of choosing suitable manufacturing and design details.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "generating," or "monitoring," or "displaying," or "tracking," or "identifying," "or receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The methods illustrated throughout the specification may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees, and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

We claim:

1. A system for automatic temperature control of a space, the system comprising:
    a temperature maintaining unit configured to provide thermal comfort in the space;
    a controller connected to the temperature maintaining unit and configured to alter at least one of a plurality of functional parameters, and corresponding values of at least one of the functional parameters, of the temperature maintaining unit; and
    a plurality of user devices, communicably connected to the controller, and configured to record personal thermal comfort preferences of a plurality of users associated with the plurality of user devices;
    wherein the controller is configured to provide real time maintaining and controlling of the temperature maintaining unit based on a control set point related to, at least in part, combined personal thermal comfort preferences of the plurality of users, satisfying the personal thermal comfort preferences of all the plurality of users;
    wherein the temperature maintaining unit is a split type air conditioner with adjustable air flow rate controlled by fan motor and direction controlled by air louver, and the controller is configured to adjust the flow rate direction to a particular user and further adjust the air flow rate to maintain the personal thermal comfort preferences of all the plurality of users.

2. The system of claim 1, further comprising: at least one temperature sensing unit configured to record temperature within the space.

3. The system of claim 2, wherein the at least one temperature sensing unit is communicably connected to the controller and the user device.

4. The system of claim 2, wherein the at least one temperature sensing unit is any one of a thermometer, a thermocouple, a thermistor, and a semiconductor temperature sensor.

5. The system of claim 1, wherein the user device is any one of a smartphone, a smartwatch, a tablet computer, and a laptop computer.

6. The system of claim 1, wherein the controller is further configured to detect presence of the plurality of user devices within the space.

7. The system of claim 1, wherein the controller is connected to the plurality of user devices through a wireless network.

8. The system of claim 7, wherein the wireless network is any one of a Bluetooth network, a ZigBee, a Wi-Fi, an internet cloud, and a cellular network.

9. A non-transitory computer-readable storage medium controlling temperature within a space, when executed by a computing device, cause the computing device to:
    sense a real time temperature status of the space being serviced by at least a temperature maintaining unit;
    detect a presence of a plurality of user devices wherein the plurality of user devices are configured to record and store personal thermal comfort preferences of a plurality of users; and
    alter at least one of a plurality of functional parameters of the temperature maintaining unit in real time based on a control set point related to, at least in part, combined personal thermal comfort preferences of the plurality of users along with the real time temperature status of the space;
    wherein the personal thermal comfort preference of each user corresponds to a thermal setting curve in a line chart of which a horizontal axis represents temperature/other thermal comfort settings, and a vertical axis represents frequency/duration; and
    the control set point is a place where both the thermal setting curves intersect each other.

* * * * *